United States Patent [19]

Nakagawa et al.

[11] Patent Number: 5,737,256
[45] Date of Patent: Apr. 7, 1998

[54] INVERSE DISCRETE COSINE TRANSFORM APPARATUS

[75] Inventors: Akira Nakagawa; Kimihiko Kazui, both of Kawaski, Japan

[73] Assignee: Fujitsu Limited, Kanagawa, Japan

[21] Appl. No.: 505,857

[22] Filed: Jul. 24, 1995

[30] Foreign Application Priority Data

Oct. 13, 1994 [JP] Japan .................................. 6-247469

[51] Int. Cl.⁶ .................................................. G06F 17/14
[52] U.S. Cl. .................... 364/725.01; 358/432; 370/208; 382/233
[58] Field of Search .................................. 364/725–727; 358/432, 433; 370/203, 208–210; 382/166, 232, 233, 248, 280, 281

[56] References Cited

U.S. PATENT DOCUMENTS

| | | | |
|---|---|---|---|
| 4,791,598 | 12/1988 | Liou et al. | 364/725 |
| 5,181,183 | 1/1993 | Miyazaki | 364/725 |
| 5,249,146 | 9/1993 | Uramoto et al. | 364/725 |
| 5,331,585 | 7/1994 | Tanaka et al. | 364/725 |
| 5,481,487 | 1/1996 | Jang et al. | 364/725 |
| 5,519,648 | 5/1996 | Kang | 364/725 |
| 5,528,533 | 6/1996 | Kitaura et al. | 364/725 |

FOREIGN PATENT DOCUMENTS

| | | |
|---|---|---|
| 63-16460 | 7/1988 | Japan . |
| 4-17464 | 1/1992 | Japan . |

OTHER PUBLICATIONS

W.H. Chen et al., "A Fast Computational Algorithm for the Discrete Cosine Transform", IEEE Trans. Comm., vol. COM–25, Sep. 1977, pp. 1004–1009.

Y. Kosugi et al., "Development of a Discrete Cosine Transform VLSI", IEICE, 1990, D–400.

B.G. Lee, "FCT–A Fast Cosine Transform", IEEE, 1984, pp. 28A.3.1–28A.3.4.

Primary Examiner—Reba I. Elmore
Assistant Examiner—Emmanuel L. Moise
Attorney, Agent, or Firm—Helfgott & Karas, P.C.

[57] ABSTRACT

An 8-point inverse discrete cosine transform (IDCT) is decomposed into four 2-point IDCTs. The four 2-point IDCTs are implemented by four parallel-operating product-sum computing circuits. Each product-sum computing circuit comprises a single multiplying means and accomplishes computation of eight points in four clock cycles. Part of the multiplying means may be implemented by bit shift operation, and others by a semifixed multiplier. A two-dimensional 8×8 IDCT circuit is constructed which comprises three semifixed multipliers and one ordinary multiplier, and accomplishes IDCT computation of 8×8 points in 64 clock cycles.

16 Claims, 24 Drawing Sheets

| TIME SLOT | $T_0$ | $T_1$ | $T_2$ | $T_3$ | $T_4$ |
|---|---|---|---|---|---|
| INPUT | $F_2$ | $F_6$ | $F_2$ | $F_6$ | $F_2$ |
| MULTIPLIER | $C_2$ | $C_6$ | $C_6$ | $C_2$ | $C_2$ |
| 72 | 0 | $F_2*C_2$ | 0 | $F_2*C_6$ | 0 |
| 74 | + | + | + | − | + |
| OUTPUT OF 74 | $F_2*C_2$ | $F_2*C_2+F_6*C_6$ | $F_2*C_6$ | $F_2*C_6-F_6*C_2$ | $F_2*C_2$ |
| 76 | | $F_2*C_2$ | $F_2*C_2+F_6*C_6$ | $F_2*C_6$ | $F_2*C_6-F_6*C_2$ |

Fig. 10

| | | | | | | | | | | | | |
|---|---|---|---|---|---|---|---|---|---|---|---|---|
| DL | 01 | 05 | 00 | 04 | 11 | 15 | 10 | 14 | 21 | 25 | 20 | 24 | --- |
| DH | 03 | 07 | 02 | 06 | 13 | 17 | 12 | 16 | 23 | 27 | 22 | 26 | --- |
| S0 | 0 | 1 | 0 | 0 | 0 | 1 | 0 | 0 | 0 | 1 | 0 | 0 | --- |
| S1 | 1 | 1 | 0 | 0 | 1 | 1 | 0 | 0 | 1 | 1 | 0 | 0 | --- |
| A0 | 01 | 03+05 / 05' | 00 | 04 | 11 | 13+15 / 15' | 10 | 14 | 21 | 23+25 / 25' | 20 | 24 | --- |
| A1 | 01+03 / 03' | 05+07 / 07' | 02 | 06 | 11+13 / 13' | 15+17 / 17' | 12 | 16 | 21+23 / 23' | 25+27 / 27' | 22 | 26 | --- |

| | | | | | | | | | | | | | |
|---|---|---|---|---|---|---|---|---|---|---|---|---|---|
| F00 | 01 | 05' | 00 | 04 | 11 | 15' | 10 | 14 | 21 | 25' | 20 | 24 | ---- |
| F01 | 03' | 07' | 02 | 06 | 13' | 17' | 12 | 16 | 23' | 27' | 22 | 26 | ---- |
| F20 | | | 01 | 05' | 00 | 04 | 11 | 15' | 10 | 14 | 21 | 25' | 20 | 24 | ---- |
| F21 | | | 03' | 07' | 02 | 06 | 13' | 17' | 12 | 16 | 23' | 27' | 22 | 26 | ---- |
| S2 | 0 | 0 | 1 | 1 | 0 | 0 | 1 | 1 | 0 | 0 | 1 | 1 | ---- |
| F30 (INPUT) | | | 00 | 04 | 11 | 15' | 10 | 14 | 21 | 25' | 20 | 24 | ---- |
| F31 (INPUT) | | | 02 | 06 | 13' | 17' | 12 | 16 | 23' | 27' | 22 | 26 | ---- |
| F32 (INPUT) | 01 | 05' | | | 11 | 15' | | | 21 | 25' | | | ---- |
| F33 (INPUT) | 03' | 07' | | | 13' | 17' | | | 23' | 27' | | | ---- |

Fig.23

| | 03' | 07' | 03' | 07' | 13' | 17' | 13' | 17' | 23' | 27' | 23' | 27' |
|---|---|---|---|---|---|---|---|---|---|---|---|---|
| F33 | 03' | 07' | 03' | 07' | 13' | 17' | 13' | 17' | 23' | 27' | 23' | 27' |
| S3 | 1 | 0 | 0 | 1 | 1 | 0 | 0 | 1 | 1 | 0 | 0 | 1 |
| F42 | c2*03' | c6*07' | c6*03' | c2*07' | c2*13' | c6*17' | c6*13' | c2*17' | c2*23' | c6*27' | c6*23' | c2*27' |
| S5 | 0 | 1 | 1 | 0 | 1 | 0 | 0 | 1 | 1 | 0 | 0 | 1 |
| AD2 | + | + | + | − | + | + | − | − | + | + | − | − |
| F52 | c2*03'<br>+c6*07' | c6*03'<br>−c2*07' | c2*13'<br>+c6*17' | c6*13'<br>−c2*17' | c2*23'<br>+c6*27' | c6*23'<br>−c2*27' | | | | | | |
| F62 LATCH TIMING | ↑ | ↑ | ↑ | ↑ | ↑ | ↑ | | | | | | |
| F62 | oo00<br>c2*03'+c6*07' | oo01<br>c6*03'−c2*07' | oo10<br>c2*13'+c6*17' | oo11<br>c6*13'−c2*17' | oo20<br>c2*23'+c6*27' | oo21<br>c6*23'−c2*27' | | | | | | |

Fig.25

| | | ee00 | ee01 | ee10 | ee11 | ee20 | ee21 | |
|---|---|---|---|---|---|---|---|---|
| F60 | | c4*00+c4*04 | c4*00−c4*04 | c4*10+c4*14 | c4*10−c4*14 | c4*20+c4*24 | c4*20−c4*24 | --- |

| | | eo00 | eo01 | eo10 | eo11 | eo20 | eo21 | |
|---|---|---|---|---|---|---|---|---|
| F61 | | c6*02+c6*06<br>c2*02−c2*06 | c6*12+c6*16<br>c2*12−c2*16 | c6*22+c6*26<br>c2*22−c2*26 | --- |

AD4: + − − + + − − +

| | e00 | e01 | e02 | e03 | e10 | e11 | e12 | e13 | e20 | e21 | e22 | e23 |
|---|---|---|---|---|---|---|---|---|---|---|---|---|
| F90 | ee00+leeo0 | ee01+lee01 | ee01−lee01 | ee00−lee00 | ee10+lee10 | ee11+lee11 | ee11−lee11 | ee10−lee10 | ee20+lee20 | ee21+lee21 | ee21−lee21 | ee20−lee20 |
| | eo00 | eo01 | eo01 | eo00 | eo10 | eo11 | eo11 | eo10 | eo20 | eo21 | eo21 | eo20 |

Fig.26

| | | | | | | | | | |
|---|---|---|---|---|---|---|---|---|---|
| F63 | | oe00 | oe01 | oe10 | oe11 | oe20 | oe21 | | |
| | | c0*01+c4*05' | c0*01−c4*05' | c0*11+c4*15' | c0*11−c4*15' | c0*21+c4*25' | c0*21−c4*25' | ---- | |
| F62 | | oo00 | oo01 | oo10 | oo11 | oo20 | oo21 | | |
| | | c2*03+c6*07' | c6*03−c2*07' | c2*13+c6*17' | c6*13−c2*17' | c2*23+c6*27' | c6*23−c2*27' | ---- | |
| AD5 | | + | − | + | − | + | − | | |
| F71 | | oo00 | oo01 | oo02 | oo03 | oo10 | oo11 | oo12 | oo13 | oo20 | oo21 | oo22 | oo23 |
| | | oe00+ | oe00− | oe01+ | oe01− | oe10+ | oe10− | oe11+ | oe11− | oe20+ | oe20− | oe21+ | oe21− |
| | | oo00 | oo00 | oo01 | oo01 | oo10 | oo10 | oo11 | oo11 | oo20 | oo20 | oo21 | oo21 |
| F81 | | o00' | o01' | o02' | o03' | o10' | o11' | o12' | o13' | o20' | o21' | o22' | o23' |
| | | o00/c1 | o01/c7 | o02/c3 | o03/c5 | o10/c1 | o11/c7 | o12/c3 | o13/c5 | o20/c1 | o21/c7 | o22/c3 | o23/c5 |
| F91 | | o00' | o01' | o02' | o03' | o10' | o11' | o12' | o13' | o20' | o21' | o22' | o23' |
| | | o00/c1 | o01/c7 | o02/c3 | o03/c5 | o10/c1 | o11/c7 | o12/c3 | o13/c5 | o20/c1 | o21/c2 | o22/c3 | o23/c5 |

Fig. 27

INVERSE DISCRETE COSINE TRANSFORM APPARATUS

BACKGROUND OF THE INVENTION

1. Field of the Invention

The present invention relates to an inverse discrete cosine transform apparatus for reconverting discrete-cosine-transformed data back into the original data.

The discrete cosine transform (DCT) is employed in bandwidth compression of image signals, and the inverse discrete cosine transform (IDCT) is used to recover the original image from the DCT compressed image signal.

2. Description of the Prior Art

A method that divides an image into blocks of M×M pixels and applies a two-dimensional discrete cosine transform on each block, is adopted in the JPEG (Joint Photographic Image Coding Experts Group) international standard for still picture image compression, the MPEG1 (Moving Picture Image Coding Experts Group Phase 1) moving picture image compression coding, and the ITU-TS (formerly CCITT) recommendation H.261. The MPEG2 coding, that can achieve greater compression than MPEG1, has also been standardized.

The method for dividing an image into M×M pixel blocks and applying a two-dimensional DCT on each block is implemented based on equation (1) below. The inverse transformation is performed using equation (2).

$$F(u,v) = C(u)C(v) \sum_{x=0}^{M-1} \sum_{y=0}^{M-1} f(x,y) \cos\left[\frac{(2x+1)u}{2M}\pi\right] \cos\left[\frac{(2y+1)v}{2M}\pi\right] \quad (1)$$

$$f(x,y) = \sum_{u=0}^{M-1} \sum_{v=0}^{M-1} C(u)C(v) F(u,v) \cos\left[\frac{(2x+1)u}{2M}\pi\right] \cos\left[\frac{(2y+1)v}{2M}\pi\right] \quad (2)$$

where
$C(u) = \frac{1}{2}$ ($u \neq 0$)
$C(u) = \sqrt{2}/4$ ($u = 0$)
$C(v) = \frac{1}{2}$ ($v \neq 0$)
$C(v) = \sqrt{2}/4$ ($v = 0$)
$F(u,v) = $ DCT coefficient
$f(x,y) = $ pixel value The values of $C(u)$ and $C(v)$ may be different by multiples of constants.

Various circuits for implementing either the DCT or IDCT, or both, have already been proposed. Known configurations include, for example, (A) a configuration for performing computations based on the above equations (1) and (2) (e.g., "Development of a Discrete Cosine Transform VLSI," The Institute of Electronics, Information and Communication Engineers, 1990 Spring National Convention, D-400), (B) a configuration for performing computations based on fast algorithms using the properties of coefficients (e.g., Japanese Unexamined Patent Publication No. 63-164640), and (C) a parallel configuration of simple circuits performing shift and product-sum operations (e.g, U.S. Pat. No. 4,791,598 or Japanese Patent Unexamined Publication No. 4-17464).

The prior art (A) provides simple circuitry and simple control, but has the problem of increased circuit size. The prior art (B) can reduce the number of multipliers because of a reduced number of multiplications, but the problem is increased complexity of circuit configuration and control logic because of the complex algorithms.

On the other hand, the prior art (C) does not require any multipliers and is simple in circuitry and control, but instead involves the use of a large number of unit time delay elements (D flip-flops) since the operating speed is achieved by a parallel configuration of simple arithmetic units. This increases the circuit size. Furthermore, in this prior art configuration, since the operating speed is proportional to the bit width of the data to be converted, when it is applied to the IDCT there is no such merit as is obtained for the DCT because the bit width of coefficients is larger in the IDCT than in the DCT.

Further, for digital television receivers or the like, decoders equipped with the DCT function are not needed, but a configuration having the IDCT function suffices for the purpose.

SUMMARY OF THE INVENTION

It is accordingly an object of the present invention to provide a configuration that is dedicated to the IDCT, is easy to control, and is small in circuit size.

According to the present invention, there is provided an 8-point inverse discrete cosine transform apparatus for converting eight function values in a frequency domain to eight function values in a domain of position variables, said eight function values in the frequency domain consisting of the zero-th to the seventh function values in increasing order of frequency, comprising:

a preprocessing circuit for preprocessing the seventh function value by adding the fifth function value, preprocessing the fifth function value by adding the third function value, and preprocessing the third function value by adding the first function value;

a first matrix computing circuit for outputting two values by multiplying a set of the zeroth and fourth function values by a first 2×2 matrix with no elements equal to 1;

a second matrix computing circuit for outputting two values by multiplying a set of the second and sixth function values by a second 2×2 matrix with no elements equal to 1;

a third matrix computing circuit for outputting two values by multiplying a set of the first function value and the preprocessed fifth function value by a third 2×2 matrix with no elements equal to 1;

a fourth matrix computing circuit for outputting two values by multiplying a set of the preprocessed third and seventh function values by a fourth 2×2 matrix with no elements equal to 1;

a first intermediate value generating circuit for outputting a first set of four intermediate values by performing addition and subtraction of the two values output from the first matrix computing circuit and the two values output from the second matrix computing circuit;

a second intermediate value generating circuit for outputting a second set of four values by first obtaining four values through addition and subtraction between the two values output from the third matrix computing circuit and the two values output from the fourth matrix computing circuit, and then multiplying the thus obtained four values by respective constants; and a postprocessing circuit for computing four function values in the domain of position variables by respectively adding the four intermediate values of the first set to the four intermediate values of the second set, and for computing the remaining four function values in the domain of position variables by respectively subtracting the four intermediate values of the second set from the four intermediate values of the first set.

According to the present invention, there is also provided an 8×8 inverse discrete cosine transform apparatus for converting 8×8 function values in a two-dimensional frequency domain to 8×8 function values in a two-dimensional domain of position variables by applying a one-dimensional inverse discrete cosine transform twice in different directions, comprising:

a first one-dimensional inverse discrete cosine transform circuit for applying a one-dimensional inverse discrete cosine transform to the 8×8 function values in the two-dimensional frequency domain in one direction of the variables;

a memory circuit for temporarily storing an output of the first one-dimensional inverse discrete cosine transform circuit; and a second one-dimensional inverse discrete cosine transform circuit for applying a one-dimensional inverse discrete cosine transform to the 8×8 function values stored in the memory circuit in the other direction of the variables;

wherein the first and second one-dimensional inverse discrete cosine transform circuits successively transform eight function values for each value of a variable not subjected to the transform, and when the eight function values are designated as the zeroth to the seventh function values in ascending order of the variables subjected to the transform, the first and second one-dimensional inverse discrete cosine transform circuits each comprise:

a preprocessing circuit for preprocessing the seventh function value by adding the fifth function value, preprocessing the fifth function value by adding the third function value, and preprocessing the third function value by adding the first function value;

a first matrix computing circuit for outputting two values by multiplying a set of the zeroth and fourth function values by a first 2×2 matrix with no elements equal to 1;

a second matrix computing circuit for outputting two values by multiplying a set of the second and sixth function values by a second 2×2 matrix with no elements equal to 1;

a third matrix computing circuit for outputting two values by multiplying a set of the first function value and the preprocessed fifth function value by a third 2×2 matrix with no elements equal to 1;

a fourth matrix computing circuit for outputting two values by multiplying a set of the preprocessed third and seventh function values by a fourth 2×2 matrix with no elements equal to 1;

a first intermediate value generating circuit for outputting a first set of four intermediate values by performing addition and subtraction between the two values output from the first matrix computing circuit and the two values output from the second matrix computing circuit;

a second intermediate value generating circuit for outputting a second set of four values by first obtaining four values through addition and subtraction of the two values output from the third matrix computing circuit and the two values output from the fourth matrix computing circuit, and then multiplying the thus obtained four values by respective constants; and a postprocessing circuit for computing four function values in the domain of position variables by respectively adding the four intermediate values of the first set to the four intermediate values of the second set, and for computing the remaining four function values in the domain of position variables by respectively subtracting the four intermediate values of the second set from the four intermediate values of the first set.

According to the present invention, there is also provided an 8×8 inverse discrete cosine transform apparatus for converting 8×8 function values in a two-dimensional frequency variability domain to 8×8 function values in a two-dimensional variability domain of position variables by applying a one-dimensional inverse discrete cosine transform twice along different directions, comprising:

a one-dimensional inverse discrete cosine transform circuit for applying a one-dimensional discrete cosine transform to the input 8×8 function values in the two-dimensional domain along one predetermined direction of the variables;

a transposition memory circuit for temporarily storing the 8×8 function values output from the one-dimensional inverse discrete cosine transform circuit, and outputting the transpose thereof, thereby changing the direction of the variables in which the one-dimensional inverse discrete cosine transform is to be applied;

a selector for selecting either the 8×8 function values in the two-dimensional frequency domain or the output of the transposition memory circuit for input to the one-dimensional inverse discrete cosine transform circuit; and a control circuit for controlling the selector to select the 8×8 function values in the two-dimensional frequency domain for the first one-dimensional inverse discrete cosine transform, and to select the output of the transposition memory circuit for the second one-dimensional inverse discrete cosine transform, wherein the one-dimensional inverse discrete cosine transform circuit successively converts eight function values for each value of a variable not subjected to the transform, and when the eight function values are designated as the zeroth to the seventh function value in an ascending order of the variables subjected to the transform, the one-dimensional inverse discrete cosine transform circuit comprises:

a preprocessing circuit for preprocessing the seventh function value by adding the fifth function value, preprocessing the fifth function value by adding the third function value, and preprocessing the third function value by adding the first function value;

a first matrix computing circuit for outputting two values by multiplying a set of the zeroth and fourth function values by a first 2×2 matrix with no elements equal to 1;

a second matrix computing circuit for outputting two values by multiplying a set of the second and sixth function values by a second 2×2 matrix with no elements equal to 1;

a third matrix computing circuit for outputting two values by multiplying a set of the first function value and the preprocessed fifth function value by a third 2×2 matrix with no elements equal to 1;

a fourth matrix computing circuit for outputting two values by multiplying a set of the preprocessed third and seventh function values by a fourth 2×2 matrix with no elements equal to 1;

a first intermediate value generating circuit for outputting a first set of four intermediate values by performing addition and subtraction between the two values output from the first matrix computing circuit and the two values output from the second matrix computing circuit;

a second intermediate value generating circuit for outputting a second set of four values by first obtaining four values through addition and subtraction between the two values output from the third matrix computing circuit and the two values output from the fourth matrix computing circuit, and then multiplying the thus obtained four values by respective constants; and a postprocessing circuit for computing four function values in the domain of position variables by respectively adding the four intermediate values of the first set to the four intermediate values of the second set, and for computing the remaining four function values in the domain of position variables by respectively subtracting the four intermediate values of the second set from the four intermediate values of the first set.

BRIEF DESCRIPTION OF THE DRAWINGS

FIG. 10 is a timing chart for explaining the operation of the circuit of FIG. 9;

FIG. 19 is a timing chart for explaining the operation of the preprocessing circuit 12 in the configuration of FIG. 18;

FIG. 20 is a timing chart for explaining the operation of the data distribution circuit 14 in the configuration of FIG. 18;

FIG. 23 is a timing chart for explaining the operation of the product-sum computing circuit 22 in the configuration of FIG. 18;

FIG. 25 is a timing chart for explaining the operation of an intermediate value generating circuit 24 in the configuration of FIG. 18;

FIG. 26 is a timing chart for explaining the operation of an intermediate value generating circuit 26 in the configuration of FIG. 18; and FIG. 27 is a timing chart for explaining the operation of a postprocessing circuit 28 in the configuration of FIG. 18.

DESCRIPTION OF THE PREFERRED EMBODIMENTS

Figure 1:
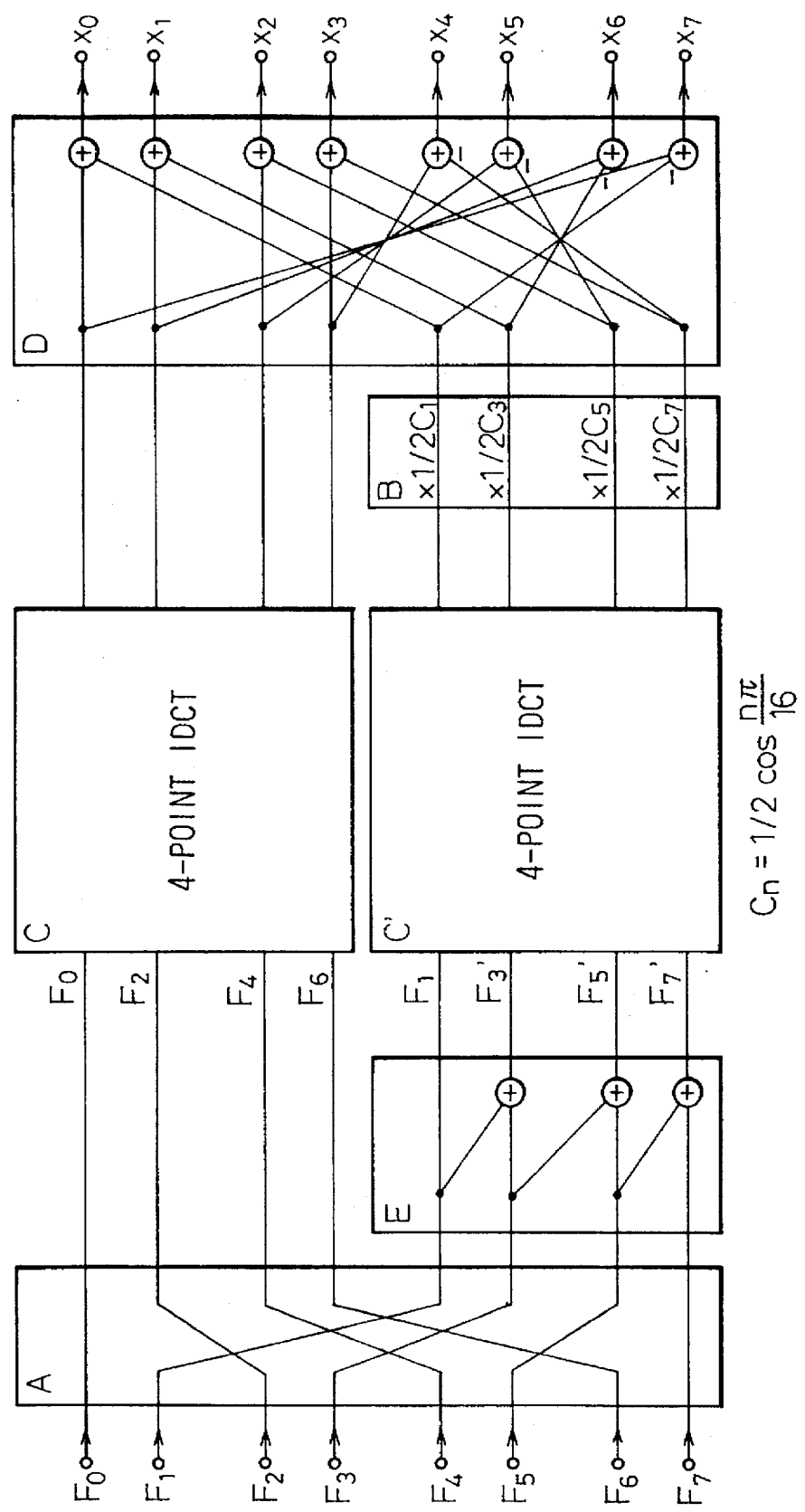
FIG. 1 is a signal flowgraph showing an 8-point IDCT decomposed into two 4-point IDCTs.

If we set $$g(u,y) = \sum_{v=0}^{M-1} C(u)\cos\left[\frac{(2x+1)u}{2M}\pi\right] \cdot F(u,v) \quad (3)$$

then equation (2) can be expressed as $$f(x,y) = \sum_{u=0}^{M-1} C(u)\cos\left[\frac{(2x+1)u}{2M}\pi\right] \cdot g(u,y) \quad (4)$$

Equations (3) and (4) are nothing but one-dimensional IDCTs along v and u directions, respectively; therefore, using the one-dimensional IDCT equation $$x(k) = \sum_{n=0}^{M-1} C(n)\cos\left[\frac{(2k+1)n}{2M}\pi\right] \cdot F(n) \quad (5)$$

F(u,v) is one-dimensional IDCTed along the v direction for each value of u, to calculate g(u,v), and again using equation (5), g(u,v) is one-dimensional IDCTed along the u direction for each value of y, to calculate f(x,y).

For M=8, when equation (5) is expressed in matrix and vector form, the following equation is given.

$$\begin{bmatrix} x_0 \\ x_1 \\ x_2 \\ x_3 \\ x_4 \\ x_5 \\ x_6 \\ x_7 \end{bmatrix} = \quad (6)$$

-continued $$\begin{bmatrix} C_4 & C_1 & C_2 & C_3 & C_4 & C_5 & C_6 & C_7 \\ C_4 & C_3 & C_6 & -C_7 & -C_4 & -C_1 & -C_2 & -C_5 \\ C_4 & C_5 & -C_6 & -C_1 & -C_4 & C_7 & C_2 & C_3 \\ C_4 & C_7 & -C_2 & -C_5 & C_4 & C_3 & -C_6 & -C_1 \\ C_4 & -C_7 & -C_2 & C_5 & C_4 & -C_3 & -C_6 & C_1 \\ C_4 & -C_5 & -C_6 & C_1 & -C_4 & -C_7 & C_2 & -C_3 \\ C_4 & -C_3 & C_6 & C_7 & -C_4 & C_1 & -C_2 & C_5 \\ C_4 & -C_1 & C_2 & -C_3 & C_4 & -C_5 & C_6 & -C_7 \end{bmatrix} \begin{bmatrix} F_0 \\ F_1 \\ F_2 \\ F_3 \\ F_4 \\ F_5 \\ F_6 \\ F_7 \end{bmatrix}$$

where $$C_n = 1/2 \cdot \cos\left(\frac{n\pi}{16}\right)$$

(The first column of the matrix is $\sqrt{2}/2 \bullet C_0$ according to equation (5), but designated here as $C_4$ which gives the same value)

By applying Lee's technique (B. G. Lee, "FCT—A Fast Cosine Transform," ICASSP 84, 28A.3), equation (6) can be decomposed into an IDCT of the four even-numbered points and an IDCT of the four odd-numbered points, as shown by equation (7).

$$X = D \cdot \begin{bmatrix} C & O \\ O & BCE \end{bmatrix} \cdot Af \qquad (7)$$

where $$X = \begin{bmatrix} X_0 \\ X_1 \\ X_2 \\ X_3 \\ X_4 \\ X_5 \\ X_6 \\ X_7 \end{bmatrix}, f = \begin{bmatrix} F_0 \\ F_1 \\ F_2 \\ F_3 \\ F_4 \\ F_5 \\ F_6 \\ F_7 \end{bmatrix},$$

$$A = \begin{bmatrix} 1 & 0 & 0 & 0 & 0 & 0 & 0 & 0 \\ 0 & 0 & 1 & 0 & 0 & 0 & 0 & 0 \\ 0 & 0 & 0 & 0 & 1 & 0 & 0 & 0 \\ 0 & 0 & 0 & 0 & 0 & 0 & 1 & 0 \\ 0 & 1 & 0 & 0 & 0 & 0 & 0 & 0 \\ 0 & 0 & 0 & 1 & 0 & 0 & 0 & 0 \\ 0 & 0 & 0 & 0 & 0 & 1 & 0 & 0 \\ 0 & 0 & 0 & 0 & 0 & 0 & 0 & 1 \end{bmatrix},$$

$$B = \begin{bmatrix} 1/(2C_1) & 0 & 0 & 0 \\ 0 & 1/(2C_3) & 0 & 0 \\ 0 & 0 & 1/(2C_5) & 0 \\ 0 & 0 & 0 & 1/(2C_7) \end{bmatrix},$$

$$C = \begin{bmatrix} C_4 & C_2 & C_4 & C_6 \\ C_4 & C_6 & -C_4 & -C_2 \\ C_4 & -C_6 & -C_4 & C_2 \\ C_4 & -C_2 & C_4 & -C_6 \end{bmatrix},$$

$$C' = \begin{bmatrix} C_0 & C_2 & C_4 & C_6 \\ C_0 & C_6 & -C_4 & -C_2 \\ C_0 & -C_6 & -C_4 & C_2 \\ C_0 & -C_2 & C_4 & -C_6 \end{bmatrix},$$

$$D = \begin{bmatrix} 1 & 0 & 0 & 0 & 1 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 1 & 0 & 0 & 0 & 1 \\ 0 & 0 & 0 & 1 & 0 & 0 & 0 & -1 \\ 0 & 0 & 1 & 0 & 0 & 0 & -1 & 0 \\ 0 & 1 & 0 & 0 & 0 & -1 & 0 & 0 \\ 1 & 0 & 0 & 0 & -1 & 0 & 0 & 0 \end{bmatrix},$$

$$E = \begin{bmatrix} 1 & 0 & 0 & 0 \\ 1 & 1 & 0 & 0 \\ 0 & 1 & 1 & 0 \\ 0 & 0 & 1 & 1 \end{bmatrix}.$$

In equation (7), A is a matrix for separating the inputs $F_0$, $F_1, F_2, \ldots, F_7$ into the even- and odd-numbered points and rearranging them in the order of $F_0, F_2, F_4, F_6, F_1, F_3, F_5, F_7$; C is an IDCT matrix for the even-numbered four points; C' is an IDCT matrix for the odd-numbered four points; E is a matrix for carrying out the preprocessing that should be performed before applying the IDCT to the odd-numbered four points; B is a matrix of coefficients by which to multiply the results of the IDCT of the odd-numbered four points; and D is a matrix for addition and subtraction between the results of the IDCT of the even-numbered points and the results of the IDCT of the odd-numbered points. FIG. 1 shows a signal flowgraph corresponding to equation (7). Symbols A to E in FIG. 1 correspond to the matrix symbols A to E.

Lee discloses a method of further decomposing the matrices C and C' using the same technique, but in the present invention, using Chen's technique (W. H. Chen et al., "A Fast Computational Algorithm for the Discrete Cosine Transform," IEEE Trans. Commun., vol. COM-25, pp. 1004–1009, September 1977), the matrices C and C' are decomposed as follows:

$$C = G \cdot \begin{bmatrix} H & O \\ O & I \end{bmatrix} \cdot J \qquad (8)$$

$$C' = G \cdot \begin{bmatrix} K & O \\ O & I \end{bmatrix} \cdot J$$

where $$G = \begin{bmatrix} 1 & 0 & 1 & 0 \\ 0 & 1 & 0 & 1 \\ 0 & 1 & 0 & -1 \\ 1 & 0 & -1 & 0 \end{bmatrix},$$

$$H = \begin{bmatrix} C_4 & C_4 \\ C_4 & -C_4 \end{bmatrix},$$

$$I = \begin{bmatrix} C_2 & C_6 \\ C_6 & -C_2 \end{bmatrix},$$

$$J = \begin{bmatrix} 1 & 0 & 0 & 0 \\ 0 & 0 & 1 & 0 \\ 0 & 1 & 0 & 0 \\ 0 & 0 & 0 & 1 \end{bmatrix},$$

-continued $$K = \begin{bmatrix} C_0 & C_4 \\ C_0 & -C_4 \end{bmatrix}.$$

In equation (8), J is a matrix for rearranging the even-numbered four points into even-numbered two points (hereinafter called the even-even paths) and odd-numbered two points (hereinafter called the even-odd paths) in the even group, and for rearranging the odd-numbered four points into even-numbered two points (hereinafter called the odd-even paths) and odd-numbered two points (hereinafter called the odd-odd paths) in the odd group; H is a two-point IDCT matrix for the even-even paths; I is a two-point IDCT matrix for the even-odd paths or the odd-odd paths; K is a two-point IDCT matrix for the odd-even paths; and G is a matrix for addition and subtraction between the results of the IDCT of the even-even paths and even-odd paths or between the odd-even paths and odd-odd paths.

Substituting equation (8) into equation (7), we have $$X = D \cdot \begin{bmatrix} G \cdot \begin{bmatrix} H & O \\ O & I \end{bmatrix} \cdot J, & O \\ O, & BG \begin{bmatrix} K & O \\ O & I \end{bmatrix} \cdot JE \end{bmatrix} \cdot Af \quad (9)$$

Figure 2:
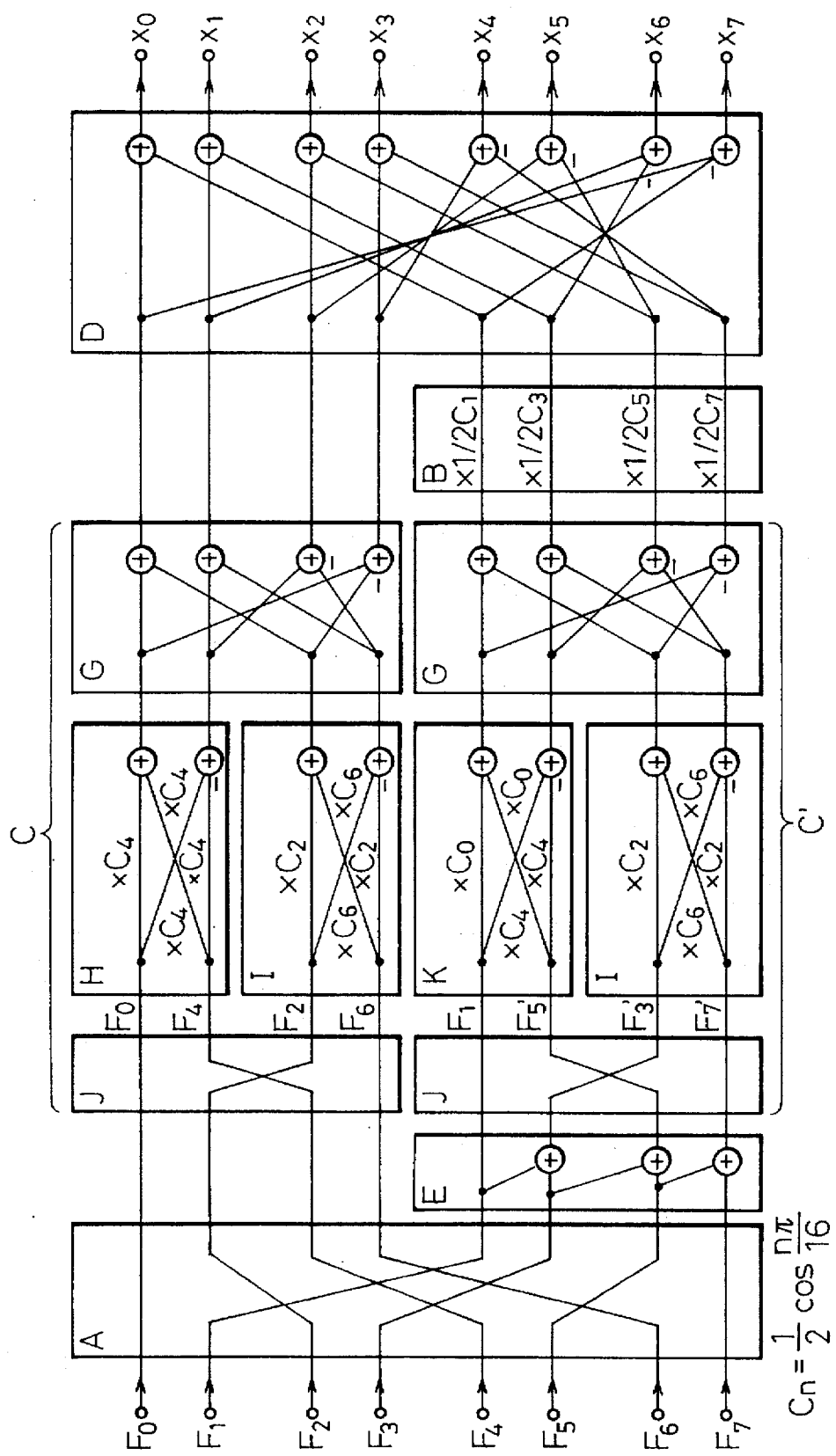
FIG. 2 is a signal flowgraph for the 8-point IDCT of the present invention, showing each of the two 4-point IDCTs further decomposed into two 2-point IDCTs.

FIG. 2 shows a signal flowgraph corresponding to equation (9). Symbols A to K correspond to the matrices A to K in FIG. 2.

$C_0$ in the matrix K is ½; since generally multiplications of a fixed value of powers of 2 can be accomplished by shift operations, ordinary multipliers are not needed. Accordingly, when the IDCT process is performed in accordance with the flow of FIG. 2, the number of multiplications is practically 18. The number of multiplications will be reduced to 16 in the above-described Chen's technique, and 13 in Lee's technique, but the process shown in FIG. 2 has various advantages for the implementation of circuits, as will be described later. Also, when the above technique is applied to the two-dimensional IDCT, the number of multiplications required for each 8-point one-dimensional IDCT can be reduced to 14, as will be described later, which is intermediate between the number of multiplications based on Chen's technique and that of Lee's technique.

Figure 3:
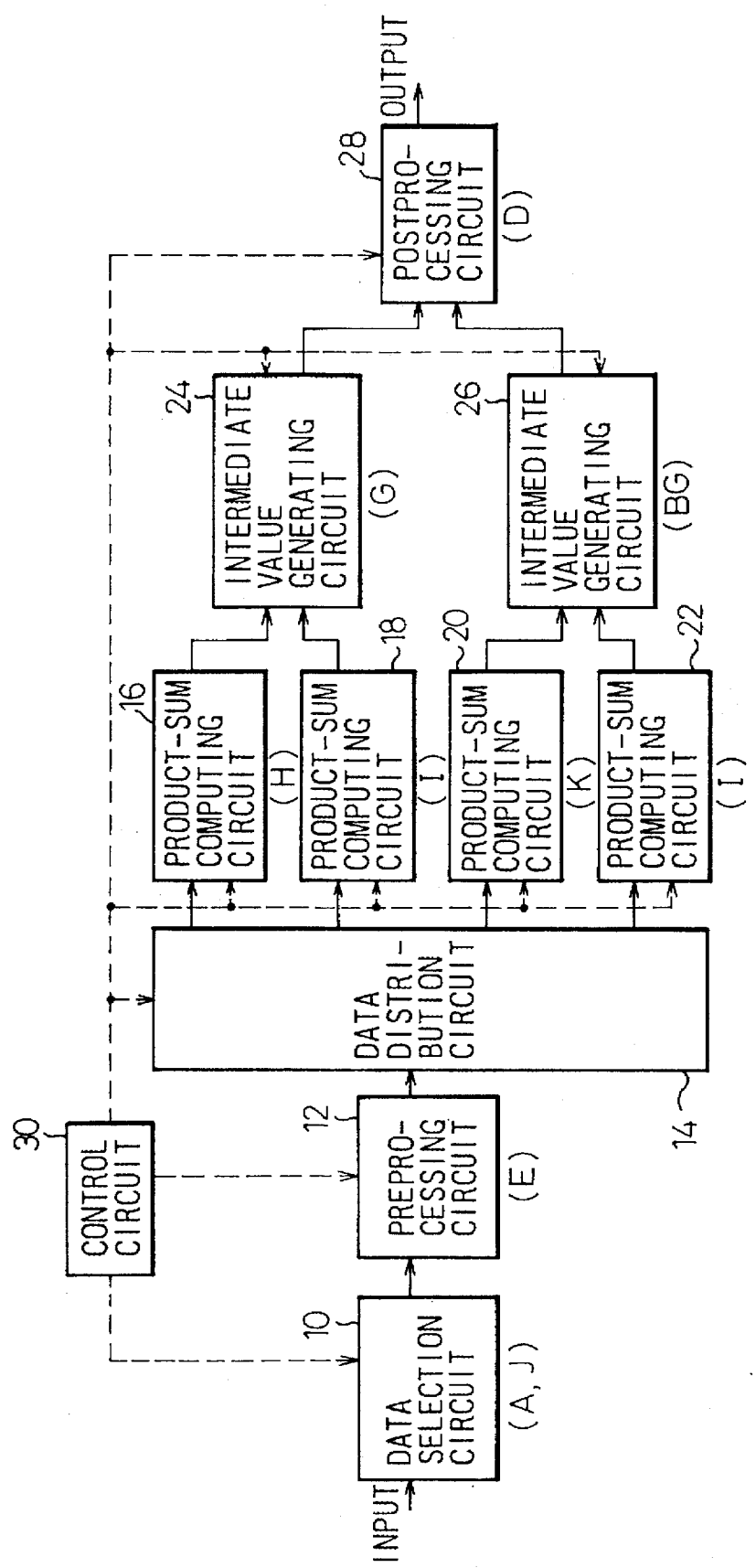
FIG. 3 is a block diagram of an 8-point IDCT circuit according to a first embodiment of the present invention.

FIG. 3 is a simplified block diagram of a one-dimensional IDCT circuit for implementing the signal processing shown in FIG. 2. In FIG. 3, a data selection circuit 10 implements the processing of the matrices A and J; a preprocessing circuit 12 implements the processing of the matrix E; a data distribution circuit 14 distributes data among product-sum computing circuits 16, 18, 20, and 22 which respectively implement the processing of the matrices H, I, K, and I; an intermediate value generating circuit 24 implements the processing of the matrix G; an intermediate value generating circuit 26 implements the processing of the matrix BG, and a postprocessing circuit 28 implements the processing of the matrix D. A control circuit 30 generates signals for controlling the data selection circuit 10, the preprocessing circuit 12, the data distribution circuit 14, the product-sum computing circuits 16, 18, 20, and 22, the intermediate value generating circuits 24 and 26, and the postprocessing circuit 28.

Figure 4:
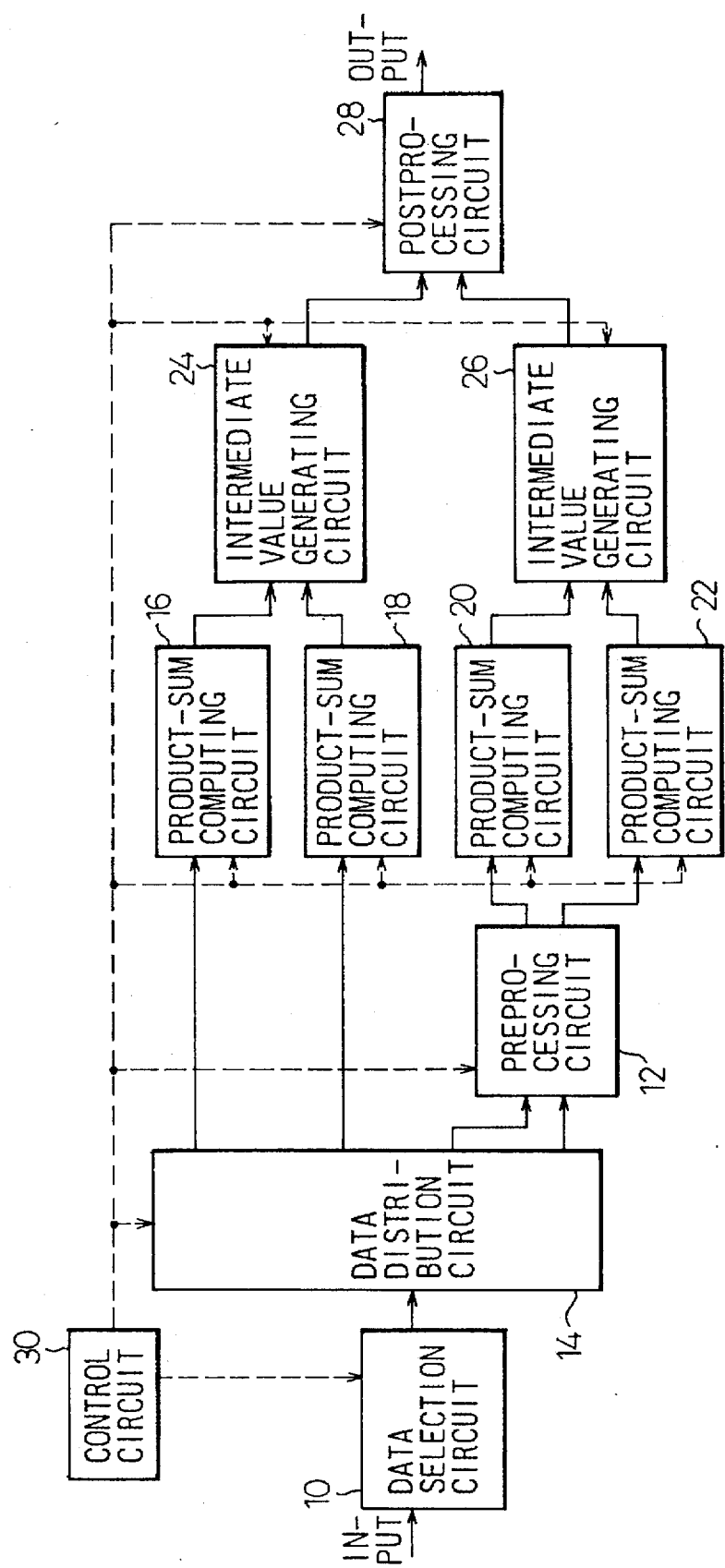
FIG. 4 is a block diagram of an 8-point IDCT circuit according to a second embodiment of the present invention.

In the IDCT circuit of the invention shown in FIG. 3, the computations of the four 2×2 matrices H, I, K, and I are implemented by a parallel arrangement of four product-sum computing circuits, each containing only a single multiplier circuit, as will be described later. This type of product-sum computing circuit completes 2×2 matrix operations on two input points in four clock cycles, as will be described later. The four product-sum computing circuits 16 to 22 together are capable of processing eight input points in 4 clock cycles, achieving an overall throughput of two points per clock cycle. The data selection circuit 10 and the preprocessing circuit 12 are therefore required to have the throughput capable of processing two points in every clock cycle. This can be achieved either by providing two signal lines having the same clock rate as that of the product-sum computing circuits, or with one signal line by setting the operating clock rate of the signal line at twice that of the product-sum computing circuits. Further, as is apparent from FIG. 2, the order of the data distributing circuit 14 and the preprocessing circuit 12 can be interchanged as shown in FIG. 4. Though not shown here, it is also possible to interchange the order of the preprocessing circuit 12 and the data selection circuit 10.

Figure 5:
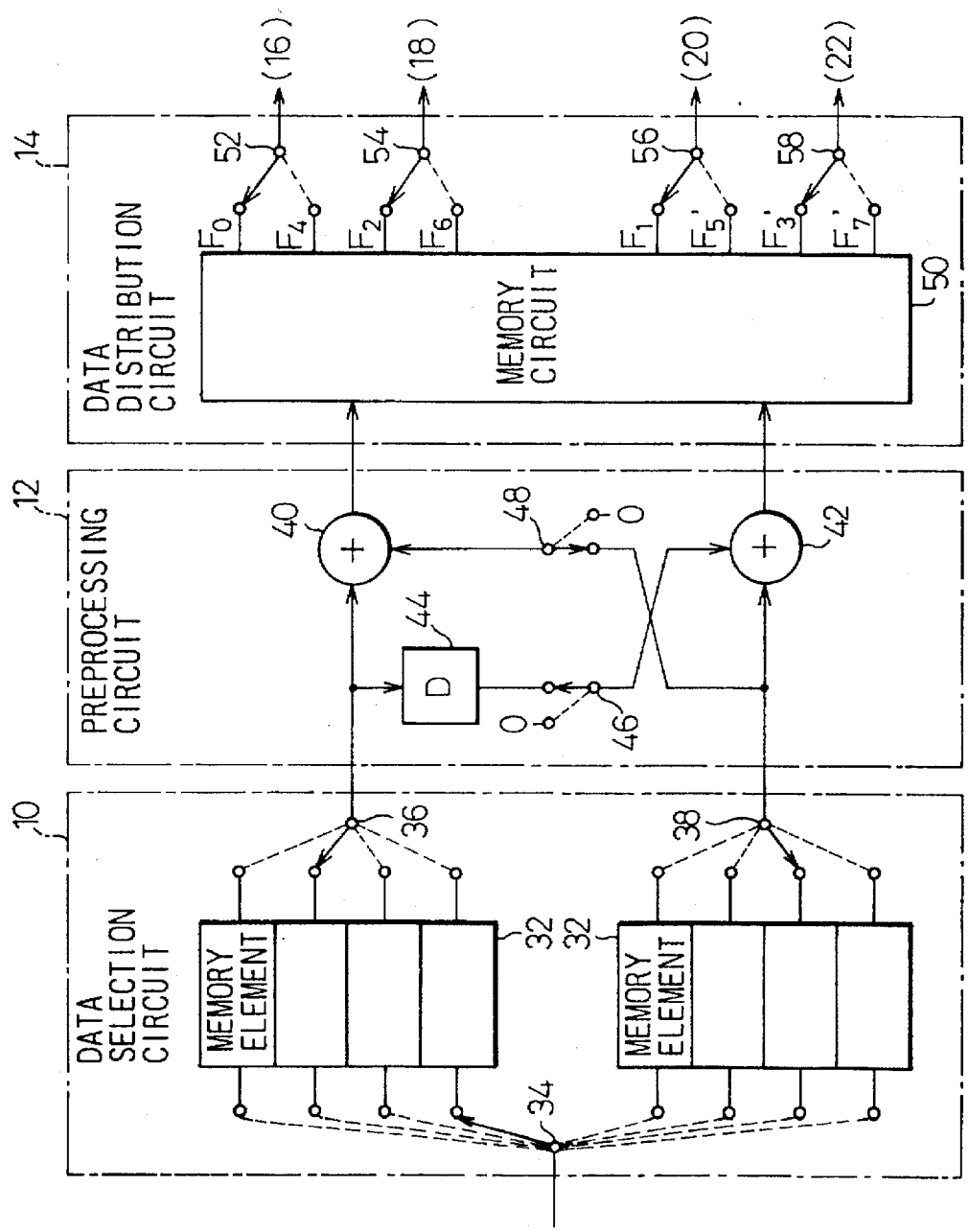
FIG. 5 is a block diagram showing a first example of the configuration of a circuit block consisting of a data selection circuit 10, a preprocessing circuit 12, and a data distribution circuit 13.

FIG. 5 shows the circuit configuration for the data selection circuit 10, the preprocessing circuit 12, and the data distribution circuit 14, in which two signal lines are provided between the data selection circuit 10 and the data distribution circuit 14 in the configuration of FIG. 3. The data selection circuit 10 includes a plurality of memory elements 32. Input data is written into the memory element selected by a selector 34, and data selected by selectors 36 and 38 are respectively directed to the two signal lines for output in parallel. The selectors 34, 36, and 38 are implemented by controlling write and read addresses to the storage elements 32.

The preprocessing circuit 12 comprises adders 40, 42, a delay element 44, and selectors 46, 48. When two of the even-numbered input data, $F_0$, $F_2$, $F_4$, and $F_6$, are output from the data selection circuit 10, both selectors 46 and 48 select "0", so that the data are just passed through the adders 40 and 42 for output. On the other hand, when $F_3$ and $F_1$ are respectively output via the selectors 36 and 38 of the data selection circuit 10, the selector 46 selects "0", while the selector 48 selects $F_1$ output via the selector 38; as a result, $F_3$ ($=F_1+F_3$) and $F_1$ are output. Next, the selectors 36 and 38 outputs $F_7$ and $F_5$, respectively, at which time the selector 46 selects the output of the delay element 44 and the selector 48 selects $F_5$ output via the selector 38; as a result, $F'_7$ ($=F_5+F_7$) and $F'_5$ ($=F_3+F_5$) are output.

The data distribution circuit 14 comprises a memory circuit 50 and selectors 52, 54, 56, 58. The data, $F_0$, $F_2$, $F_4$, $F_6$, $F_1$, $F'_3$, $F'_5$, and $F'_7$, output from the preprocessing circuit 12 are temporarily stored in the memory circuit 50; when the selectors 52 to 58 are set to the positions shown by the solid lines, $F_0$, $F_2$, $F_1$, and $F'_3$ are supplied to the product-sum computing circuits 16, 18, 20, and 22, respectively, and when they are set to the positions shown by the dotted lines, $F_4$, $F_6$, $F'_5$, and $F'_7$ are respectively supplied.

Figure 6:
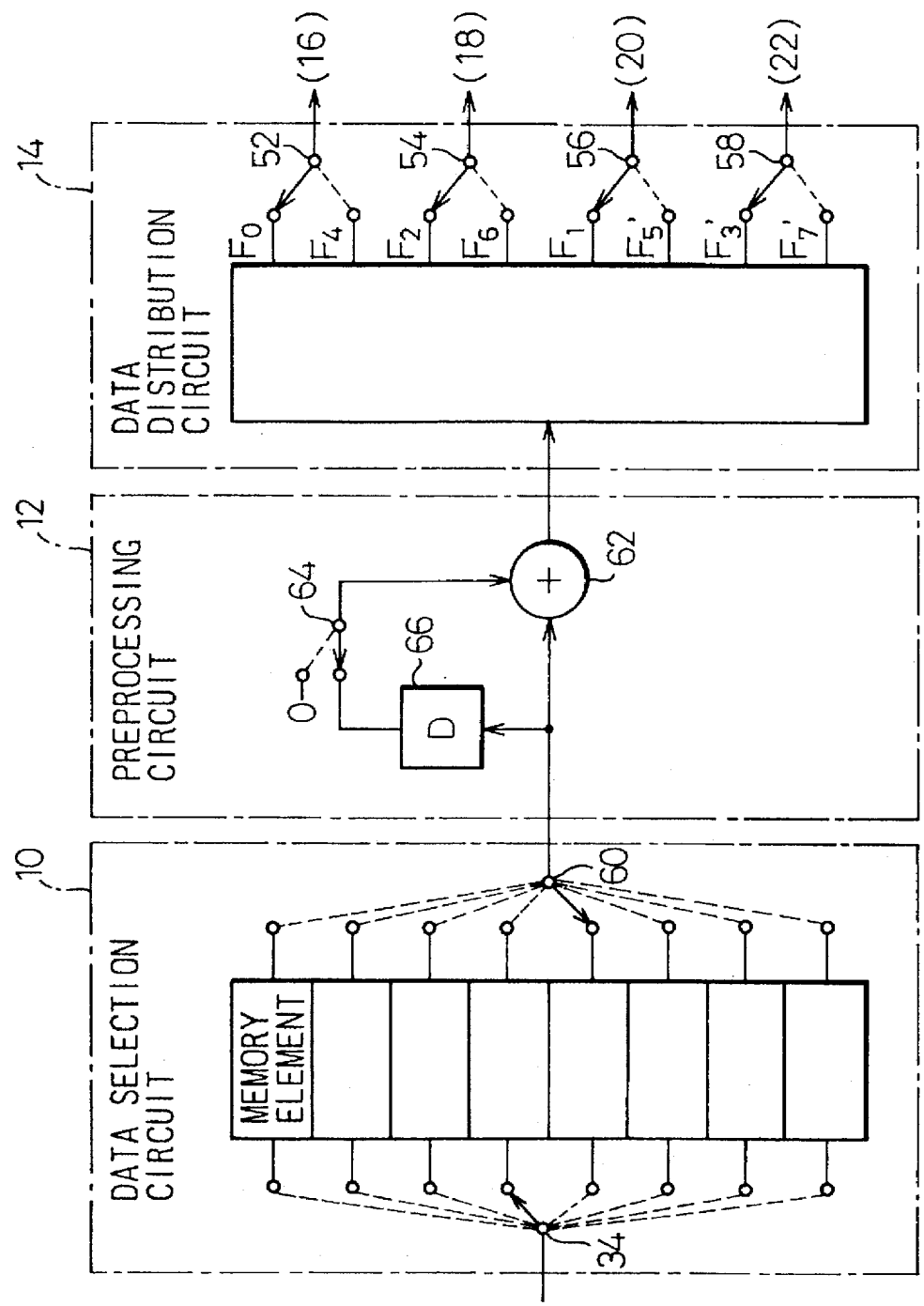
FIG. 6 is a block diagram showing a second example of the configuration of the circuit block consisting of the data selection circuit 10, the preprocessing circuit 12, and the data distribution circuit 13.

FIG. 6 shows a configuration adapted to operate at a clock rate twice that of the product-sum computing circuits in the configuration of FIG. 3. The circuit configuration for the data selection circuit 10 and the data distribution circuit 14 is substantially the same as that shown in FIG. 5. The preprocessing circuit 12 comprises an adder 62, a selector 64, and a delay element 66. When any one of $F_0$, $F_2$, $F_4$, $F_6$, and $F_1$ is output from the data selection circuit 10, the selector 64 selects "0", so that the data is just passed through the adder 62 for output. After $F_1$, $F_3$ is output, in which case the selector 64 selects the output of the delay element 66 so that $F'_3$ ($=F_1+F_3$) is output from the adder 62. Next, $F_5$ is output from the data selection circuit 10; in this case also, the selector 64 selects the output of the delay element 66, so that $F'_5$ ($=F_3+F_5$) is output from the adder 62. When the data selection circuit 10 next outputs $F_7$, the selector 64 again selects the output of the delay element 66, so that $F_7$ (=$F_5$+$F_7$) is output from the adder 62.

Figure 7:
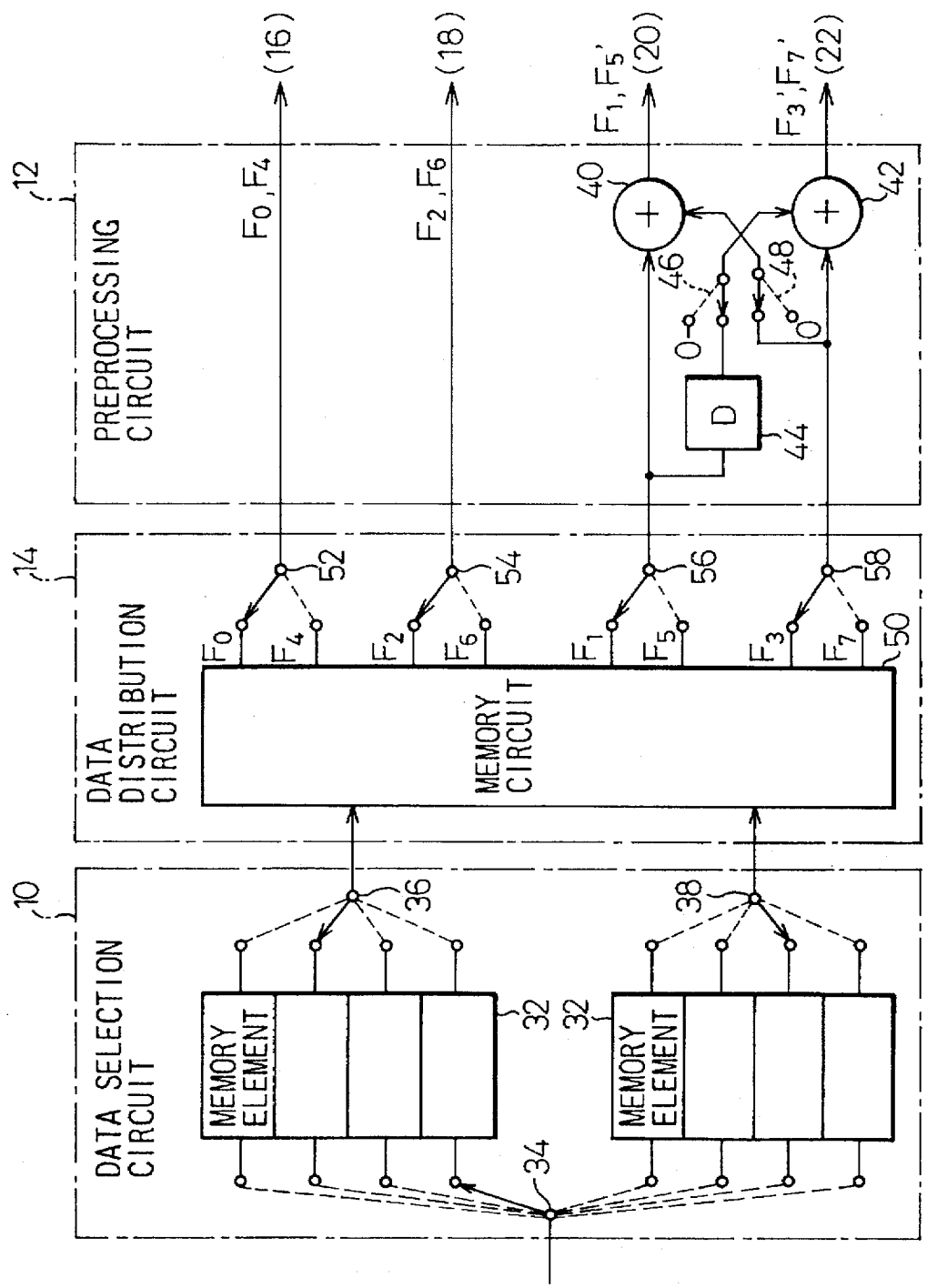
FIG. 7 is a block diagram showing a third example of the configuration of the circuit block consisting of the data selection circuit 10, the preprocessing circuit 12, and the data distribution circuit 13.

FIG. 7 shows a circuit configuration when two signal lines are provided in the configuration of FIG. 4. The only difference from FIG. 5 is that the order of the data distribution circuit 14 and the preprocessing circuit 12 is interchanged, but the operation of each circuit is the same. Therefore, a further description is omitted.

Figure 8:
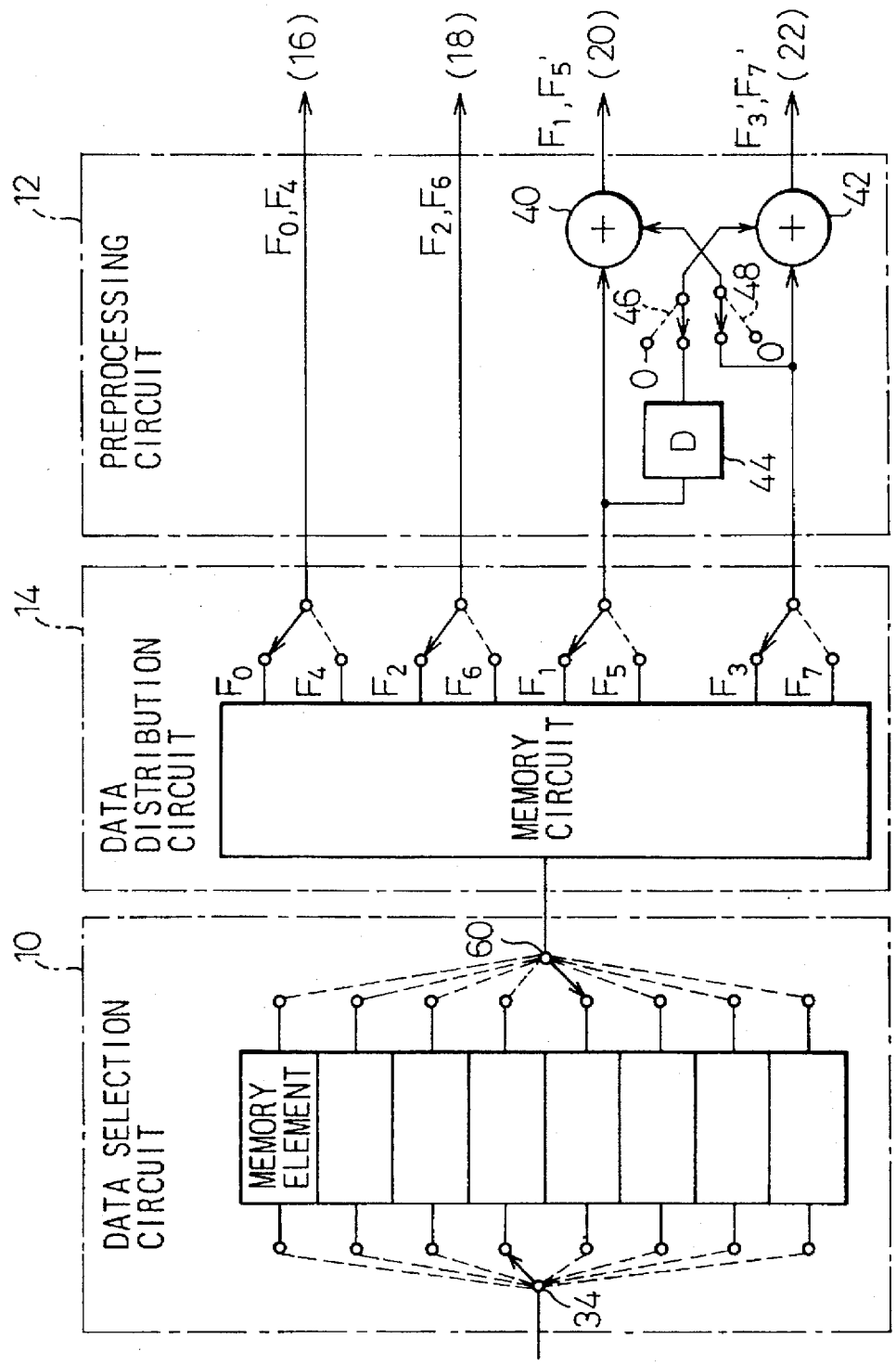
FIG. 8 is a block diagram showing a fourth example of the configuration of the circuit block consisting of the data selection circuit 10, the preprocessing circuit 12, and the data distribution circuit 13.

FIG. 8 shows a circuit configuration when the operating clock rate is doubled in the configuration of FIG. 4. As compared to FIG. 7, the number of signal lines from the data selection circuit 10 to the data distribution circuit 14 is reduced to one, while the operating speed of the selector 60 is twice that of the corresponding parts in FIG. 7.

Figure 9:
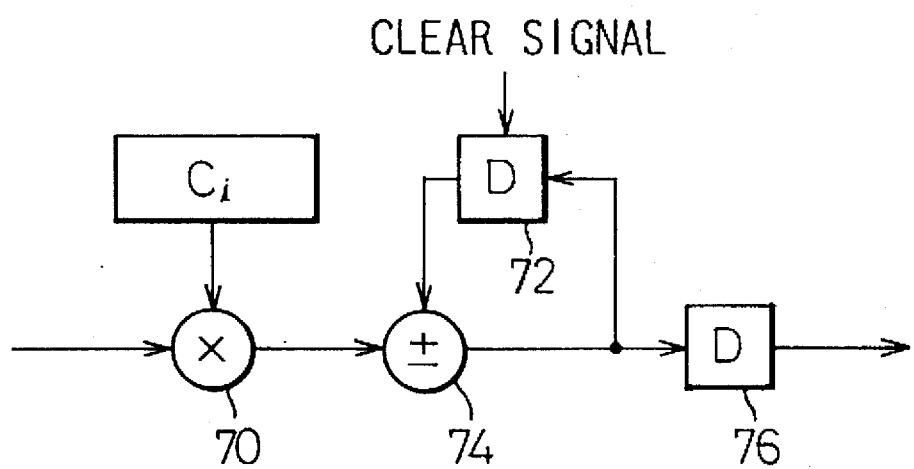
FIG. 9 is a circuit diagram for a product-sum computing circuit 16, 18, 20 or 22.

FIG. 9 shows the basic configuration of the product-sum computing circuit in the IDCT circuit of the present invention. The product-sum computing circuit of the present invention comprises a multiplier 70 for multiplying an input value by a coefficient Ci (=½ cos iπ/16), an adder-subtractor 74 for performing addition/subtraction between the output of the multiplier 70 and the output of a delay element 72, and a delay element 76 for latching the output of the adder-subtractor 74. The output of the adder-subtractor 74 is also connected to an input of the delay circuit 72.

The operation of the product-sum computing circuit of FIG. 9 will be described using the timing chart shown in FIG. 10 by taking as an example the product-sum computing circuit 18 which performs the computation of the matrix I (for the even-odd paths or the odd-odd paths). In time slot $T_0$, the delay element 72 is cleared by a clear signal, the adder-subtractor 74 is set as an adder, $F_2$ is input, and $C_2$ is set as the multiplier. As a result, the adder-subtractor 74 outputs $F_2*C_2$, and in the next time slot $T_1$, $F_2*C_2$ is latched in the delay element 72. In this time slot $T_1$, $F_6$ is input and $C_6$ is set. Accordingly, the adder-subtractor 74 outputs $F_2*C_2+F_6*C_6$, and in the next time slot $T_2$, the result $F_2*C_2+F_6*C_6$ is output from the delay element 76. In this time slot $T_2$, the delay element 72 is cleared, $F_2$ is input, and $C_6$ is set. As a result, the adder-subtractor 74 outputs $F_2*C_6$, and in the next time slot $T_3$, $F_2*C_6$ is latched in the delay element 72. In this time slot $T_3$, $F_6$ is input, $C_2$ is set, and the adder-subtractor 74 is set as a subtractor. Accordingly, the adder-subtractor 74 outputs $F_2*C_6-F_6*C_2$, and in the next time slot $T_4$, the result $F_2*C_6-F_6*C_2$ is output from the delay element 76. In this manner, the product-sum computing circuit of the configuration shown in FIG. 9 accomplishes 2×2 matrix operations with four clock pulses by using a single multiplier.

Figure 11:
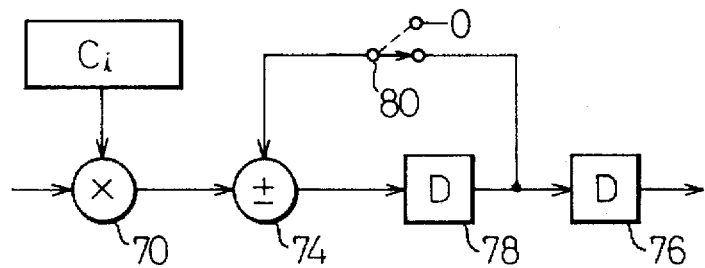
FIG. 11 is a circuit diagram showing another example of the product-sum computing circuit.

FIG. 11 shows a variation of the circuit of FIG. 9, in which the delay element 72 with a clear input is replaced by a delay element 78 and a selector 80. The operation is substantially the same as that of the circuit of FIG. 9.

The product-sum computing circuits 16, 18, 20, and 22 may be implemented using the circuit configuration shown in FIG. 9 or 11, but considering the properties of the multipliers in the respective circuits, the circuit configuration can be further simplified as described below.

Figure 12:
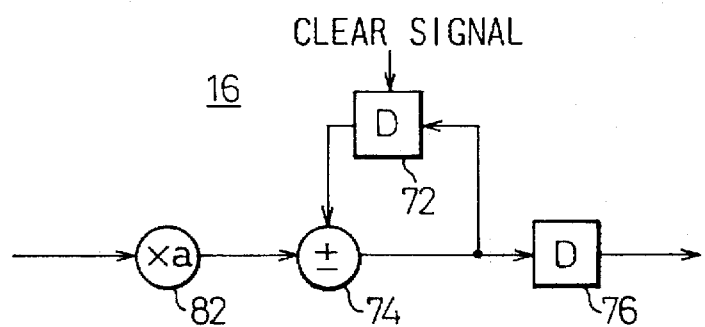
FIG. 12 is a circuit diagram for the product-sum computing circuit 16.

FIG. 12 shows the configuration of the product-sum computing circuit 16 (for the matrix H) that processes the even-even paths. Since the multiplier used in the product-sum computing circuit 16 is always $C_4$ (=$\sqrt{2}/4$), a semifixed multiplier 82 with a fixed multiplier can be used as the multiplier 70 in FIG. 9. A semifixed multiplier can be realized with less than half the circuit size of an ordinary multiplier.

Figure 13:
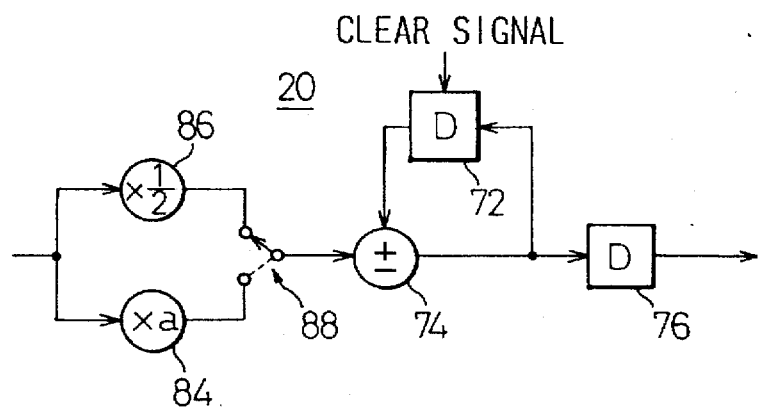
FIG. 13 is a circuit diagram for the product-sum computing circuit 20.

FIG. 13 shows the configuration of the product-sum computing circuit 20 (for the matrix K) that performs computations for the odd-even paths. One of the two multipliers used in the product-sum computing circuit 20 is ½ (=$C_0$), which can be accomplished by a simple bit shift operation. Accordingly, if the multiplier 70 in FIG. 9 is replaced by a semifixed multiplier 84 and a bit shift circuit 86 with a selector 88 for switching between them, the circuit size can be reduced.

Figure 14:
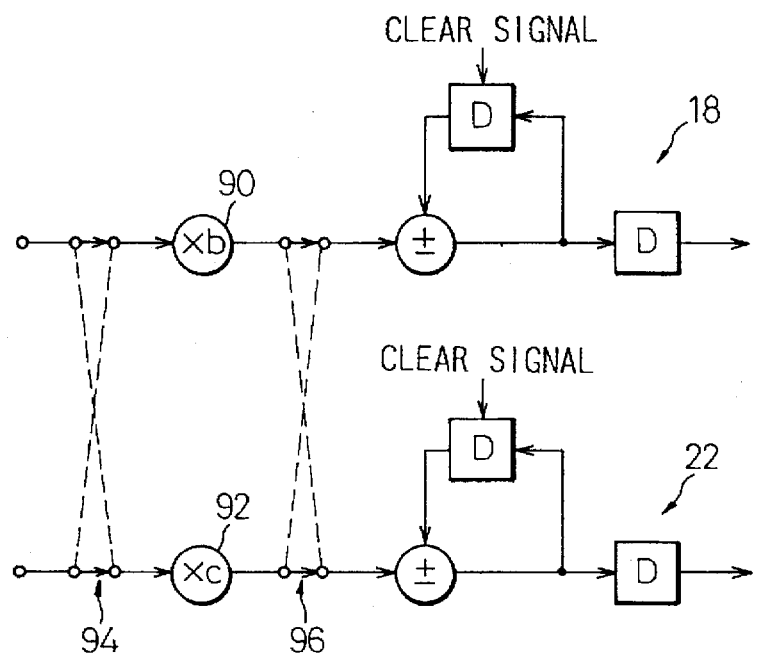
FIG. 14 is a circuit diagram for the product-sum computing circuits 18 and 22.

FIG. 14 shows the configuration of the product-sum computing circuits 18 and 22 (for the matrix I) that perform computations for the even-odd paths and odd-odd paths. The product-sum computing circuits 18 and 22 both use two multipliers $C_2$ and $C_6$. With the product-sum computing circuits 18 and 22 arranged in parallel, if two semifixed multipliers 90 and 92 having fixed multipliers C2 and C6 respectively are so arrange as to be used alternately by time division using switches 94 and 96, as shown in FIG. 14, the circuit size can be reduced.

It will be recognized that the delay element 78 and selector 80 shown in FIG. 11 can be used, instead of the delay element 72 with a clear input, in any of the configurations shown in FIGS. 12 to 14.

Next, the two-dimensional IDCT circuit will be described. As earlier described, when one-dimensional IDCT is applied to the DCT coefficients F(u,v) (u,v=0, 1, 2, . . . , M−1) along the v direction for each value of u, g(u,y) is calculated, and when one-dimensional IDCT is applied to g(u,y) along the u direction for each value of y, the pixel values f(x,y) (x,y=0, 1, 2, . . . , M−1) are obtained.

Figure 15:
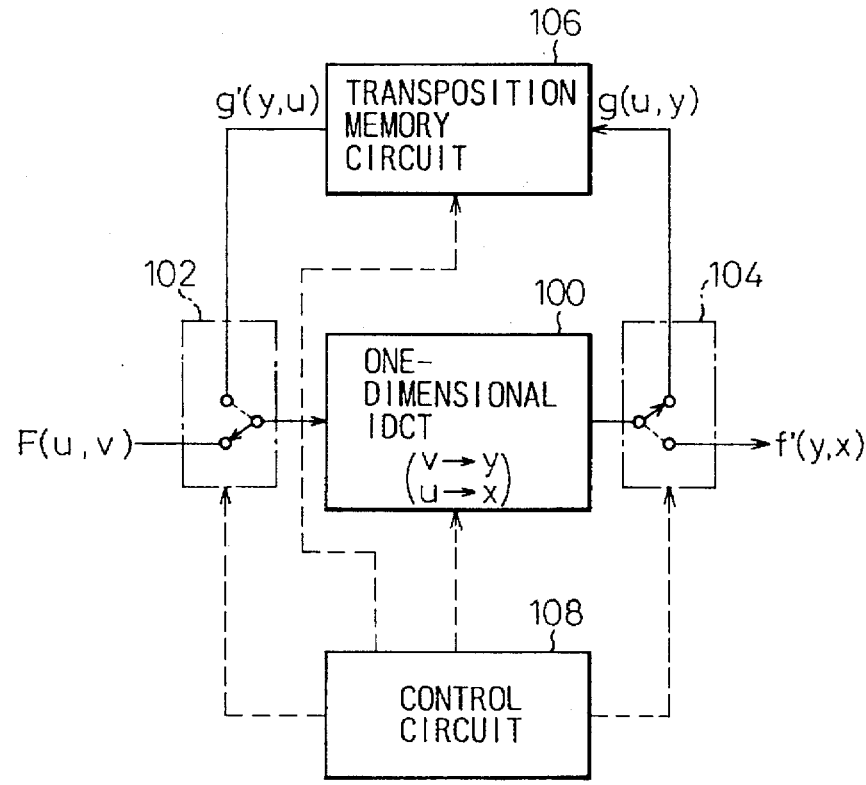
FIG. 15 is a block diagram of a two-dimensional IDCT circuit according to a first embodiment of the present invention.

FIG. 15 shows a first example of the two-dimensional IDCT circuit. In this example, a transposition memory circuit 106 is connected, via selectors 102 and 104, to a one-dimensional IDCT circuit 100 which has the same configuration as previously described. With this arrangement, a two-dimensional IDCT can be implemented using a single, one-dimensional IDCT circuit through which input data is passed twice. A control circuit 108 controls the selectors 102 and 104, and also read/write operations of the transposition memory circuit 106.

In the first-stage computation of the one-dimensional IDCT which is applied along the v direction, the selector 102 selects input data F(u,v) for its input, while the selector 104 selects the transposition memory circuit 106 for its output. With this setting, the one-dimensional IDCT is computed along the v direction for each value of u and, as a result, g(u,y) is stored in the transposition memory circuit 106. In the second-stage computation of the one-dimensional IDCT which is applied along the u direction, the selector 102 selects the output of the transposition memory circuit 106 for its input. As a result, g'(y,u), the transpose of g(u,y), is read from the transposition memory circuit 106, and transformed by the one-dimensional IDCT circuit 100 into f'(y,x) which is the transpose of f(x,y). When the configuration of the invention is employed, the one-dimensional IDCT circuit 100 is capable of converting 8 points in four clock cycles, which means that an 8×8 two-dimensional IDCT can be accomplished in 64 (=4×8×2) clock cycles. In other words, the one-dimensional IDCT circuit of the present invention is capable of sufficiently fast processing even if the same circuit is used in both the first and second stages, as shown in FIG. 15.

Figure 16:
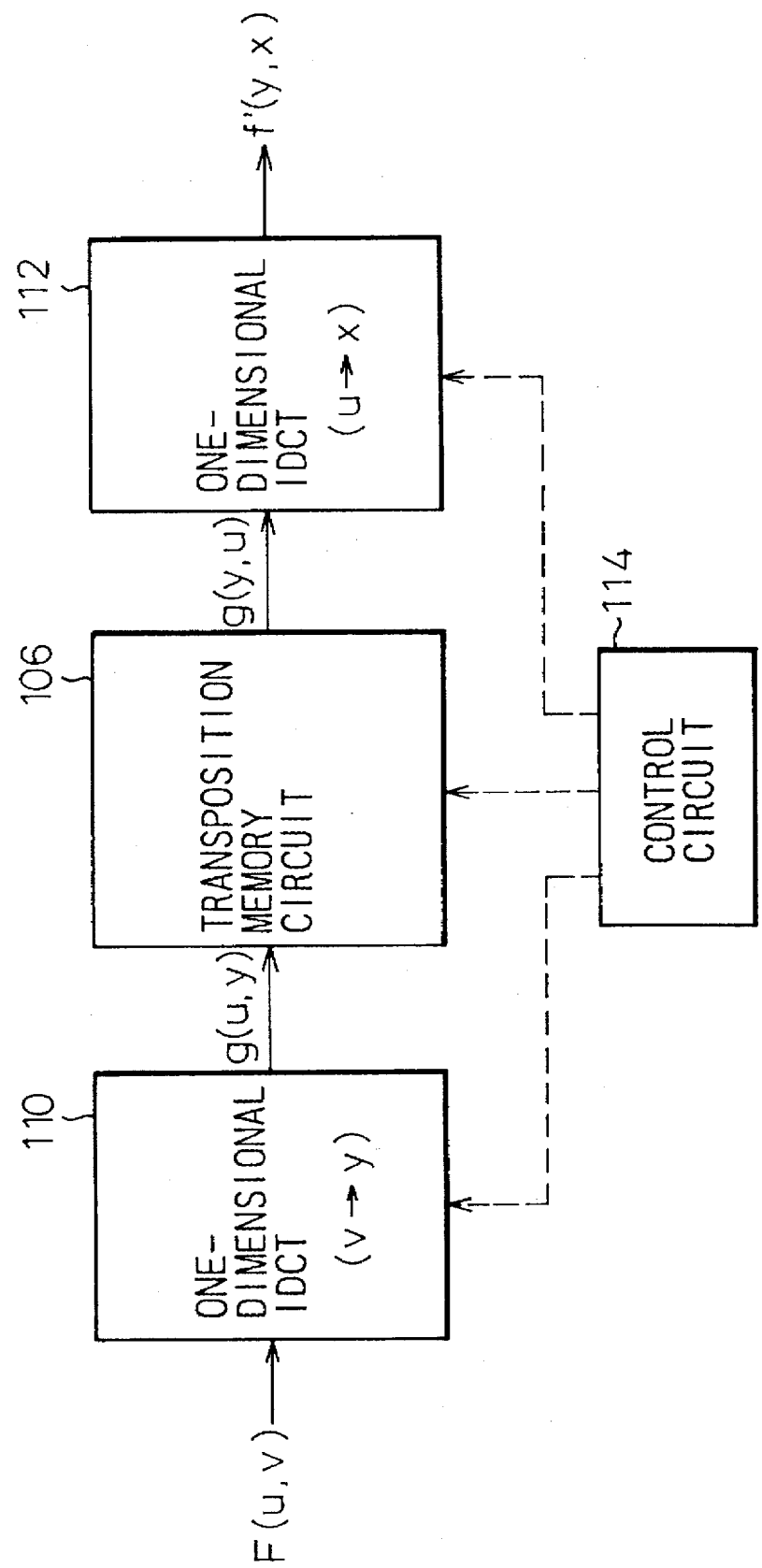
FIG. 16 is a block diagram of a two-dimensional IDCT circuit according to a second embodiment of the present invention.

FIG. 16 shows a second example of the two-dimensional IDCT circuit. In this example, two one-dimensional IDCT circuits, 110 and 112, are used, one before and the other after the transposition memory circuit 106. With the two-dimensional IDCT circuit of FIG. 16, the circuit size is doubled, but the processing speed is also doubled.

Figure 17:
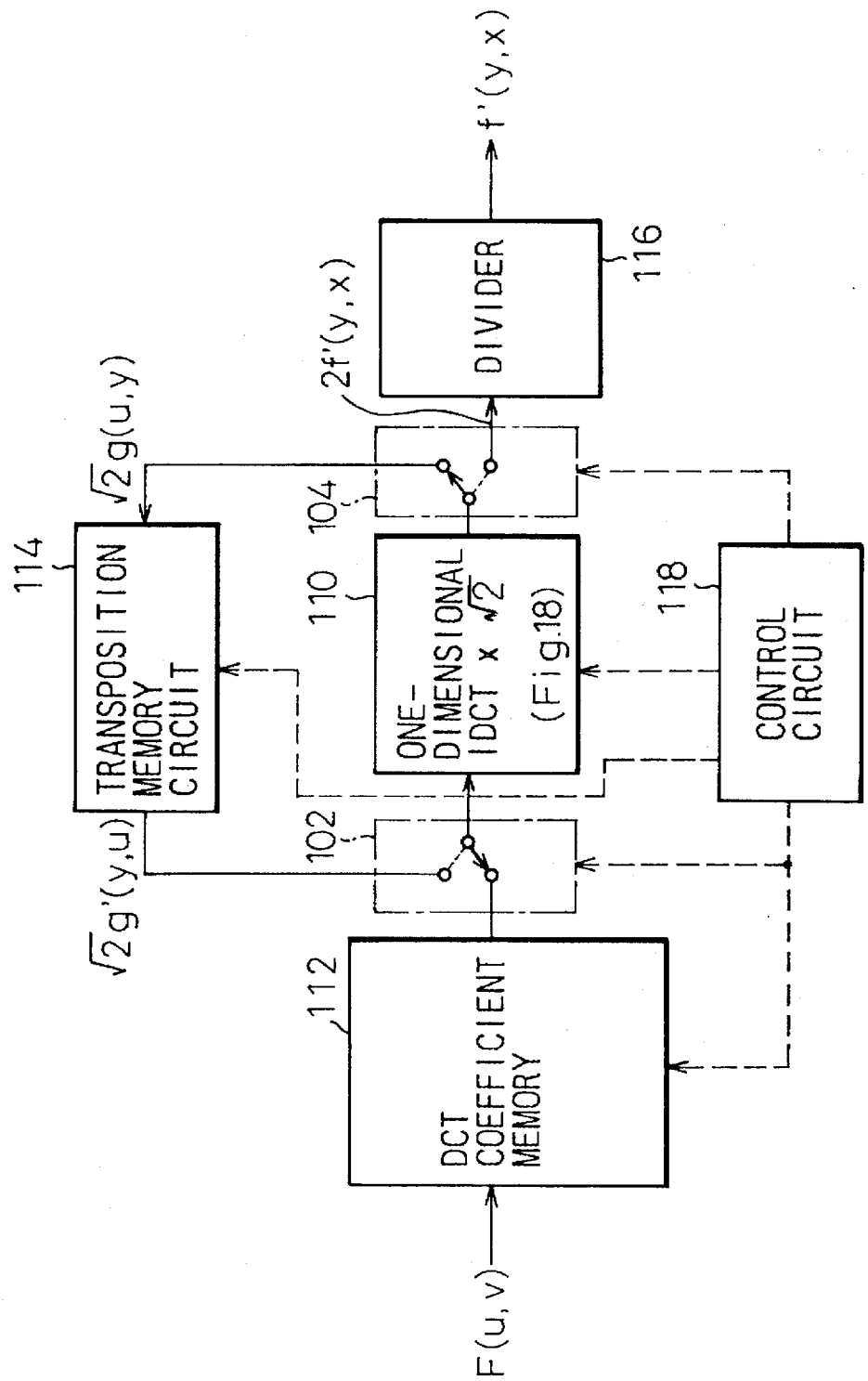
FIG. 17 is a block diagram of a two-dimensional IDCT circuit according to a third embodiment of the present invention.

FIG. 17 shows a further example of the two-dimensional IDCT circuit. As in the example of FIG. 15, a single one-dimensional IDCT circuit 110 is used which is switched in twice under the control of the selectors 102 and 104. In the example shown here, a DCT coefficient memory 112 is provided on the input side, and the data selection circuit 10 for the one-dimensional IDCT circuit is implemented by using the DCT coefficient memory 112 and controlling its read address or by using the transposition memory circuit 114 and controlling its read address. The one-dimensional IDCT circuit 110 outputs the one-dimensional IDCT result multiplied bye. This configuration achieves a further reduction in circuit size, as will be explained hereinafter. Here, since in the computation of the two-dimensional IDCT the result is multiplied by √2 twice and the output value is thus doubled, the value is multiplied by ½ in a divider 116 by bit shifting.

When both sides of equation (9) defining the one-dimensional IDCT are multiplied by √2, we have $$\sqrt{2} = D \cdot \begin{bmatrix} G \cdot \begin{bmatrix} H & O \\ O & I \end{bmatrix} \cdot J, & O \\ O, & BG \begin{bmatrix} K & O \\ O & I \end{bmatrix} \cdot JE \end{bmatrix} \cdot Af \quad (10)$$

where $$H' = \sqrt{2}\, H = \begin{bmatrix} C_4' & C_4' \\ C_4' & -C_4' \end{bmatrix},$$

$$I' = \sqrt{2}\, I = \begin{bmatrix} C_2' & C_6' \\ C_6' & -C_2' \end{bmatrix},$$

$$K' = \sqrt{2}\, K = \begin{bmatrix} C_0' & C_4' \\ C_0' & -C_4' \end{bmatrix},$$

$$C_n' = \frac{\sqrt{2}}{2} \cos\left(\frac{n\pi}{16}\right).$$

Here, since $C_4' = ½$, the multiplier 82 (FIG. 12) in the product-sum computing circuit 16 for the even-even paths can be implemented only by bit shift operations, thus achieving a further reduction in circuit size.

When the two-dimensional IDCT is performed using equation (10), the number of multiplications is 14 for each 8-point one-dimensional IDCT, which means 224 multiplications for one 8×8 block. The number of multiplications is slightly larger than that required in the previously described Lee's technique (13 multiplications for each 8-point one-dimensional IDCT, amounting to 208 multiplications for one 8×8 block), but since the multiplications can be accomplished using three semifixed multipliers and one ordinary multiplier, and since an 8-point one-dimensional IDCT can be completed in four clock cycles, requiring a total of 64 clock cycles for one 8×8 block, a two-dimensional IDCT apparatus capable of fast processing can be achieved with small circuit size.

Since the DCT coefficients for one 8×8 block are often stored or transmitted in a zigzag scanning order, the two-dimensional IDCT can be performed using a circuit that temporarily stores the results for at least one block and reads them out in the order suitable for the two-dimensional IDCT. More specifically, the DCT coefficient memory 112 in the example shown in FIG. 17 can be configured to store the coefficients for at least one block and output them in the order suitable for the IDCT process.

Figure 18:
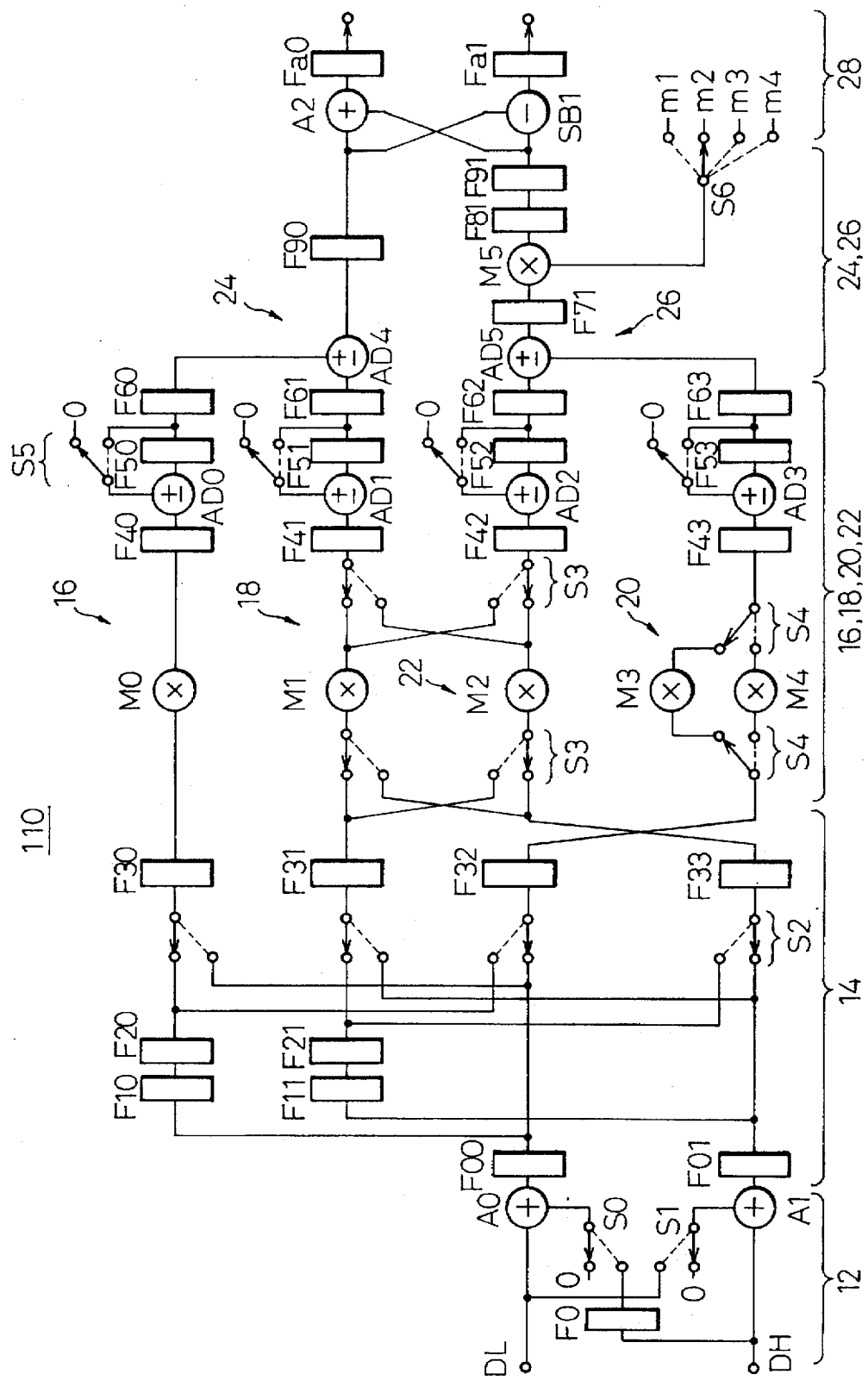
FIG. 18 is a circuit diagram for the one-dimensional IDCT circuit 110 shown in FIG. 17.

FIG. 18 shows the detailed configuration of the one-dimensional IDCT circuit 110 of FIG. 17. The example shown in FIG. 18 incorporates the circuit configurations described with reference to FIGS. 3, 5, 12, 13, and 14. The data selection circuit 10, however, is implemented by using the DCT coefficient memory 112 and the transposition memory circuit 114 (FIG. 17) and by controlling their read addresses. Further, a bit shift circuit is used instead of the semifixed multiplier 82 shown in FIG. 12.

In the circuit of FIG. 18, the preprocessing circuit 12 for performing the computation of the matrix E is implemented using a circuit consisting of a flip-flop F0, switches S0 and S1, and adders A0 and A1. The data distribution circuit 14 is implemented using a circuit consisting of flip-flops F00, F01, F10, F20, F11, F21, F30, F31, F32, and F33, and a switch S2. The product-sum computing circuit 16 for performing the computation of the matrix H' is implemented using a circuit consisting of a bit shift circuit M0 for multiplying by $C_4'$ (=½), flip-flops F40, F50, and F60, an adder-subtractor AD0, and one circuit of a four-circuit switch S5. The product-sum computing circuits 18 and 22 for performing the computation of the matrix I are together implemented using a circuit consisting of a semifixed multiplier M1 for multiplying by $C_2'$ (=cos(π/8)/√2), a semifixed multiplier M2 for multiplying by $C_6'$ (=cos(3π/8)/√2), switch S3, flip-flops F41, F42, F51, F52, F61, and F62, adder-subtractors AD1 and AD2, and two circuits of the switch S5. The product-sum computing circuit 20 for performing the computation of the matrix K' is implemented using a circuit consisting of a bit shift circuit M3 for multiplying by $C_4'$ (=½), a semifixed multiplier M4 for multiplying by $C_0'$ (=1/√2), switch S4, flip-flops F43, F53, and F63, an adder-subtractor AD3, and one circuit of the switch S5. The intermediate value generating circuit 24 for performing the computation of the matrix G is implemented using a circuit consisting of an adder-subtractor AD4 and a flip-flop F90. The intermediate value generating circuit 26 for performing the computation of the matrix BG is implemented using a circuit consisting of an adder-subtractor AD5, flip-flops F71, F81, and F91, and a multiplier M5. The multiplier M5 multiplies by one number selected by a switch S6 from among m1 (=½ cos(π/16)), m2 (=½ cos(3π/16)), m3 (=½ cos(5π/16)), and m4 (=½ cos(7π/16)). The postprocessing circuit 28 for performing the computation of the matrix D is implemented using a circuit consisting of flip-flops Fa0 and Fa1, an adder A2, and a subtractor SB1.

FIG. 19 is a timing chart for explaining the operation of the preprocessing circuit 12 in the configuration of FIG. 18. From input lines DL and DH, data are input, for example, with the timing shown in FIG. 19. Each piece of data is represented by a two-digit number. In the first-stage conversion from F(u,v) to √2g(u,y), the data 00, 01, ..., 10, 11, ... represent F(0,0), F(0,1), ..., F(1,0), F(1,1), ..., respectively. In the second-stage conversion from √2g'(y,u) to 2f(y,x), the data 00, 01, ..., 10, 11, ... represent √2g' (0,0), √2g' (0,1), ..., √2g' (1,0), √2g' (1,1), ..., respectively. For the switches S0 and S1, "0" indicates the selection of the input shown by the solid line, and "1" indicates the selection of the input shown by the dotted line. The same applies for the other switches.

In FIG. 19, when data t1 and t3 (t=0, 1, 2, ..., 7; the same applies hereinafter) are input on the input lines DL and DH, respectively, S0 selects the solid-lined input, while S1 selects the dotted-lined input. As a result, the adder A0 outputs the data t1, while the adder A1 outputs t3' (=t1+t3). In the next time slot, data t5 and t7 are input and, in this case, the switches S0 and S1 both select the dotted-lined inputs while the previous input t3 remains latched in the flip-flop F0. As a result, the adder A0 outputs data t5' (=t3+t5), and the adder A1 outputs data t7' (=t5+t7). When even-numbered data t0, t2, t4, and t6 are input, the data are output just as they are input, since the switches S0 and S1 both select the solid-lined inputs "0". In this manner, the operation of the preprocessing circuit 12 (matrix E) is accomplished.

FIG. 20 is a timing chart for explaining the operation of the data distribution circuit 14 in the configuration of FIG. 18. The above-described outputs from the adders A0 and A1 are latched respectively into the flip-flops F00 and F01 which, with a delay of one clock cycle, output the data in the order shown in the figure. The flip-flops F20 and F21 output the data in the same order with a delay of two further clock cycles. The switch S2 is controlled, as shown in the figure, to distribute data t0 and t4 in turn to the flip-flop F30 on the even-even paths, data t2 and t6 in turn to the flip-flop F31 on the even-odd paths, data t1 and t5' in turn to the flip-flop F32 on the odd-even paths, and data t3' and t7' in turn to the flip-flop F33 on the odd-odd paths.

Figure 21:
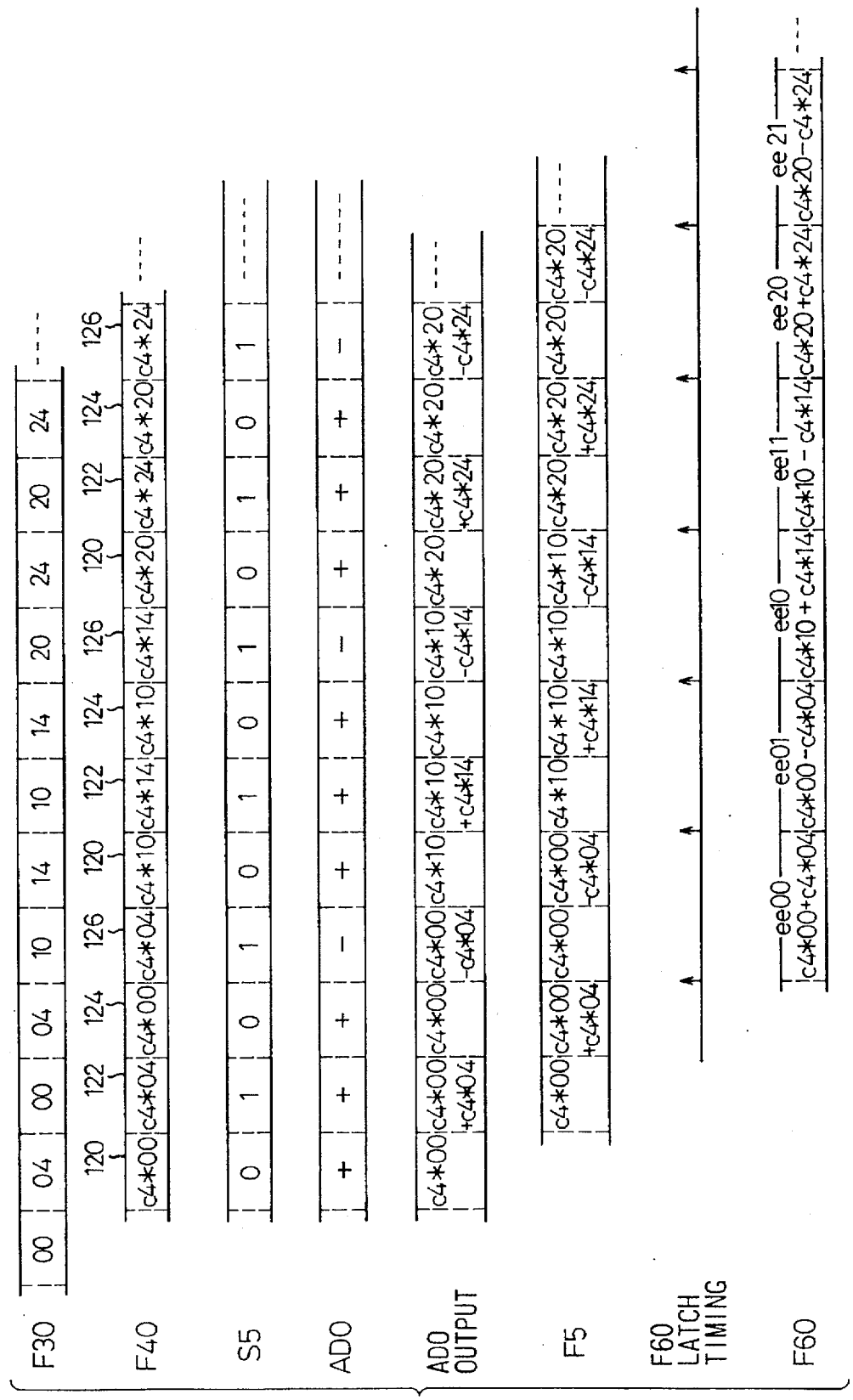
FIG. 21 is a timing chart for explaining the operation of the product-sum computing circuit 16 in the configuration of FIG. 18.

FIG. 21 is a timing chart for explaining the operation of the product-sum computing circuit 16 for the even-even paths in the configuration of FIG. 18. As described above, data t0 and t4 are alternately latched in the flip-flop F30. The result of multiplying either data by $C'_4$ (=½) (designated C4*t0 or C4*t4 in the figure; similar designations are used hereinafter) is latched in the flip-flop F40 with a delay of one clock cycle. In time slot 120 in which $C'_4$*(data t0) is latched in the flip-flop F40, the switch S5 selects the solid-lined input (value "0"), and the adder-subtractor AD0 is set as an adder, so that the adder-subtractor AD0 outputs $C'_4$*(data t0). In the next time slot 122, this value is latched in the flip-flop F50. In the time slot 122, $C'_4$*(data t4) is latched in the flip-flop F40, and S5 selects the dotted-lined input (flip-flop F50), so that the adder-subtractor AD0 outputs the sum of the values of the flip-flops F40 and F50, i.e., $C'_4$*(data t0)+$C'_4$*(data t4), which is latched into the flip-flop F50 in the next time slot 124. In the next time slot 126, the value is latched into the flip-flop F60 as an even-even path value eet0. In the time slot 124, since the switch S5 selects the solid-lined input (value "0"), the adder-subtractor AD0 outputs the value of the flip-flop F40, i.e, $C'_4$*(data t0), which is latched into the flip-flop F50 in the next time slot 126. In the time slot 126, $C'_4$*(data t4) is latched in the flip-flop F40, the switch S5 selects the dotted-lined input (flip-flop F50), and the adder-subtractor AD0 is set as a subtractor. Accordingly, the adder-subtractor AD0 outputs the result of subtracting the value of the flip-flop F40 from the value of the flip-flop F50, i.e, $C'_4$*(data t0)−$C'_4$*(data t4), which is latched into the flip-flop F50 in the next time slot 120. In the next time slot 122, the value is latched into the flip-flop F60 as an even-even path value eet1. In this manner, the flip-flop F60 outputs eet0 and eet1 alternately at intervals of two clock cycles in a period of four clock cycles.

Figure 22:
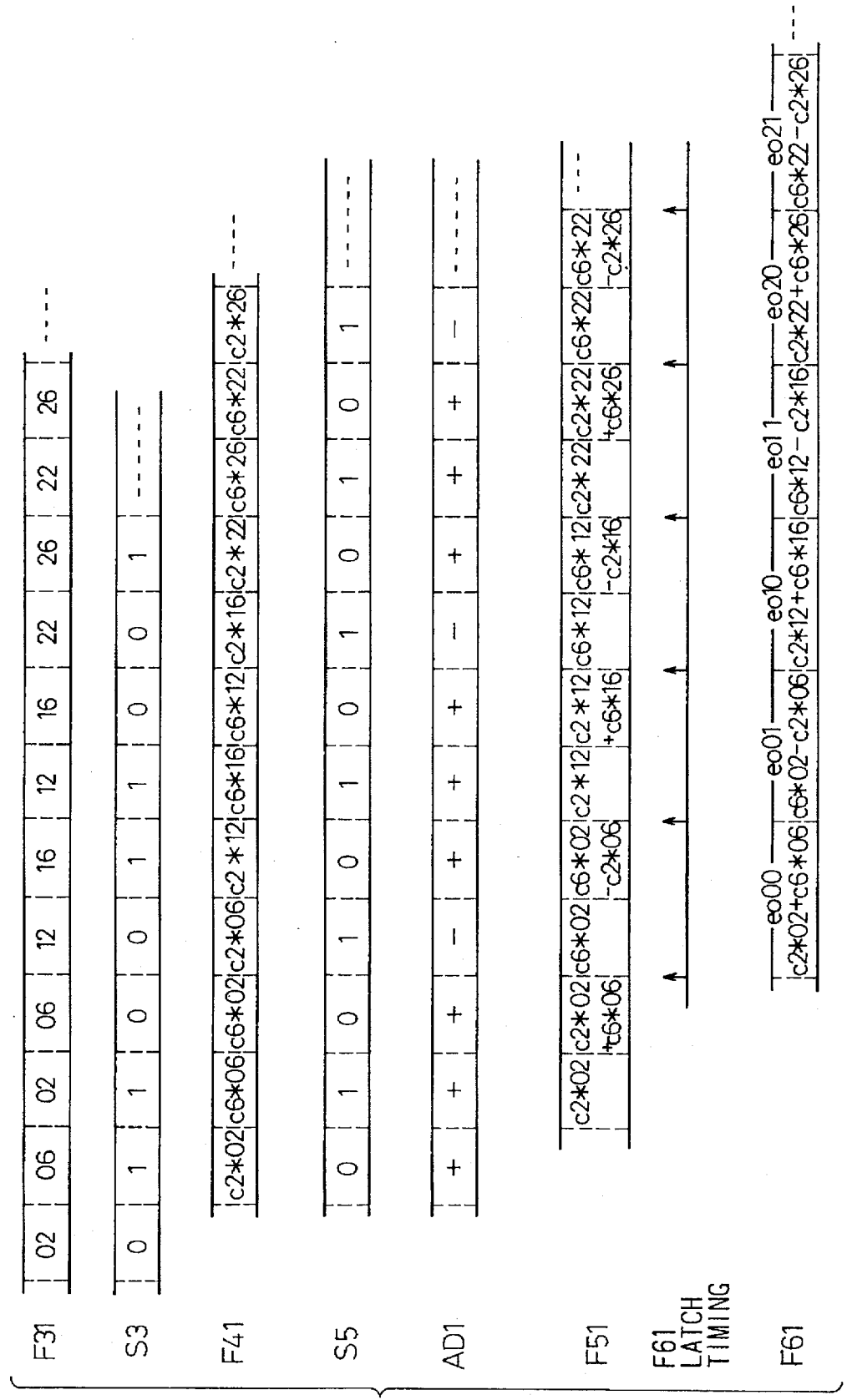
FIG. 22 is a timing chart for explaining the operation of the product-sum computing circuit 18 in the configuration of FIG. 18.

FIG. 22 is a timing chart for explaining the operation of the product-sum computing circuit 18 for the even-odd paths in the configuration of FIG. 18. The flip-flop F31 alternately latches data t2 and t6, as earlier described. Since the switch S3 is controlled as shown in the figure, $C'_2$*(data t2), $C'_6$*(data t6), $C'_6$*(data t2), and $C'_2$*(data t6) are latched in this order into the flip-flop F41. The same operations as those performed in the product-sum computing circuit 16 are carried out on these values, and the flip-flop F61 outputs eot0 (=$C'_2$*(data t2)+$C'_6$*(data t6)) and eot1 (=$C'_6$*(data t2)−$C'_2$*(data t6)) alternately at intervals of two clock cycles in a period of four clock cycles.

FIG. 23 is a timing chart for explaining the operation of the product-sum computing circuit 22 for the odd-odd paths in the configuration of FIG. 18. The flip-flop F33 alternately latches data t3' and t7', as earlier described. Since the switch S3 is controlled as shown in the figure, $C'_2$*(data t3'), $C'_6$*(data t7'), $C'_6$*(data t3'), and $C'_2$*(data t7') are latched in this order into the flip-flop F42. It should, however, be noted that, as can be seen from FIG. 20, the phase of data in the timing chart of FIG. 23 is two clock cycles ahead of that in FIGS. 21 and 22. By so arranging the timing, the semifixed multiplier M1 for multiplying by $C'_2$ and the semifixed multiplier M2 for multiplying by $C'_6$ can be shared between the product-sum computing circuits 18 and 24. The same operations as those performed in the product-sum computing circuit 16 are carried out on the above values, and the flip-flop F62 outputs oot0 (=$C'_2$*(data t3')+$C'_6$*(data t7')) and oot1 (=$C'_6$*(data t3')−$C'_2$*(data t7')) alternately at intervals of two clock cycles in a period of four clock cycles.

Figure 24:
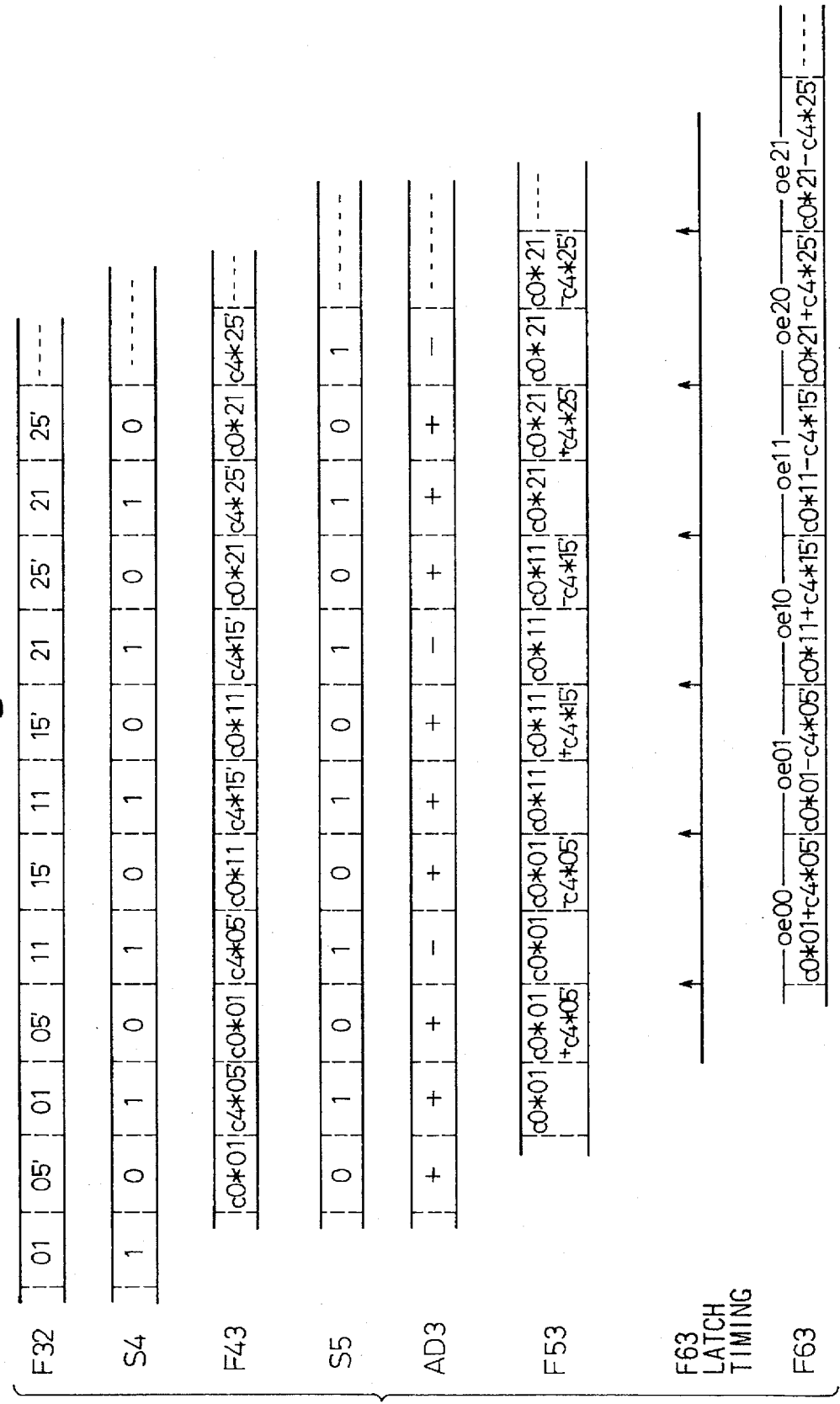
FIG. 24 is a timing chart for explaining the operation of the product-sum computing circuit 20 in the configuration of FIG. 18.

FIG. 24 is a timing chart for explaining the operation of the product-sum computing circuit 20 for the odd-even paths in the configuration of FIG. 18. The flip-flop F32 alternately latches data t1 and t5', as earlier described. Since the switch S4 is controlled as shown in the figure, $C'_0$*(data t1), $C'_4$*(data t5'), $C'_0$*(data t1), and $C'_4$*(data t5') are latched in this order into the flip-flop F43. The same operations as those performed in the product-sum computing circuit 16 are carried out on these values, and the flip-flop F63 outputs oet0 (=$C'_0$*(data t1)+$C'_4$*(data t5')) and oet1 (=$C'_0$*(data t1)−$C'_4$*(data t5')) alternately at intervals of two clock cycles in a period of four clock cycles.

FIG. 25 is a timing chart for explaining the operation of the intermediate value generating circuit 24 in the configuration of FIG. 18. The flip-flops F60 and F61 respectively output two calculation results for the even-even paths or even-odd paths, alternately at intervals of two clock cycles, as previously described; accordingly, by controlling the adder-subtractor AD4 as shown in the figure, four intermediate values for the even-numbered paths are calculated, one in every clock cycle, and are latched into the flip-flop F90.

FIG. 26 is a timing chart for explaining the operation of the intermediate value generating circuit 26 in the configuration of FIG. 18. The flip-flops F63 and F62 respectively output two calculation results for the odd-even paths or odd-odd paths, alternately at intervals of two clock cycles, as previously described; accordingly, by controlling the adder-subtractor AD5 as shown in the figure, four values are calculated, one in every clock cycle, as in the case of the intermediate value generating circuit 24. Further, these values are multiplied in the multiplier M5 by the respective coefficients, to calculate the four intermediate values for the odd-numbered paths, which values are then latched into the flip-flop F81. Since the phase of the data for the odd-numbered paths at this stage is one clock ahead of that for the even-numbered paths, the flip-flop F91 is provided to achieve phase synchronization between the two.

Figure 27:
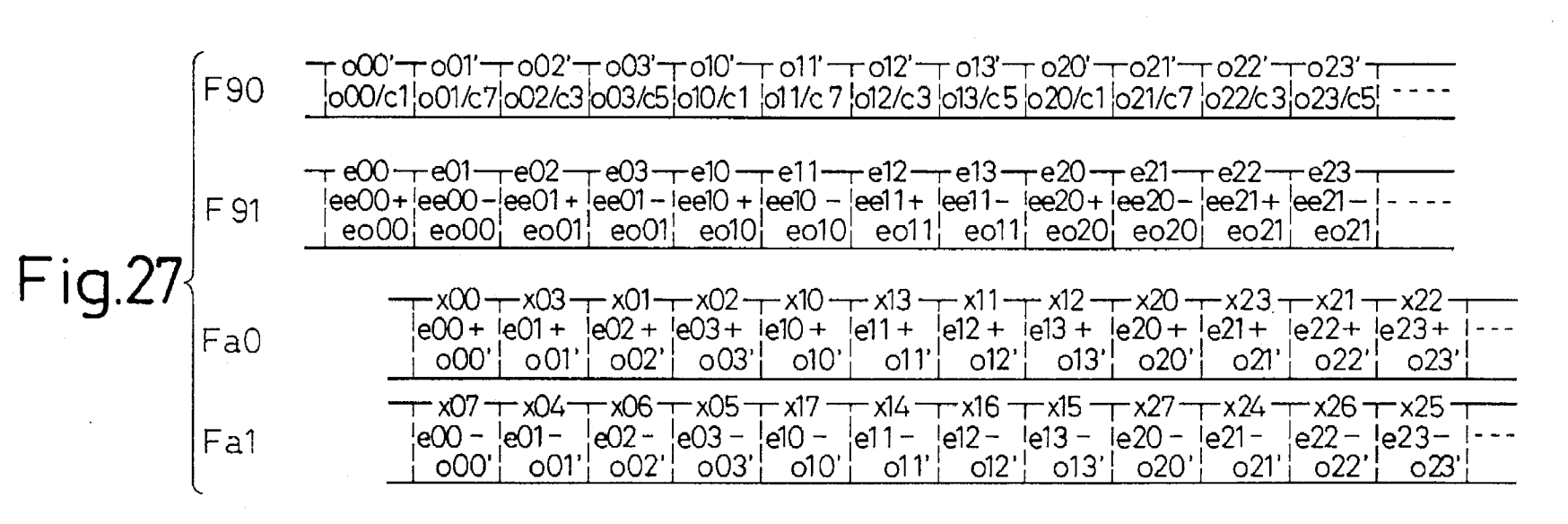

FIG. 27 is a timing chart for explaining the operation of the postprocessing circuit 28 in the configuration of FIG. 18. Since the four intermediate values for the even-numbered paths and those for the odd-numbered paths are respectively latched in the flip-flops F90 and F91, both are added together to obtain transformed results, xt0, xt1, xt2, and xt3, and one subtracted from the other to obtain transformed results xt4, xt5, xt6, and xt7.

We claim:

1. An 8-point inverse discrete cosine transform apparatus for converting eight function values in a frequency domain to eight function values in a domain of position variables, said eight function values in the frequency domain consisting of the zero-th to the seventh function values in increasing order of frequency, comprising:

a preprocessing circuit for preprocessing the seventh function value by adding the fifth function value, preprocessing the fifth function value by adding the third function value, and preprocessing the third function value by adding the first function value;

a first matrix computing circuit for outputting two values by multiplying a set of the zeroth and fourth function values by a first 2×2 matrix with no elements equal to 1;

a second matrix computing circuit for outputting two values by multiplying a set of the second and sixth function values by a second 2×2 matrix with no elements equal to 1;

a third matrix computing circuit for outputting two values by multiplying a set of the first function value and the preprocessed fifth function value by a third 2×2 matrix with no elements equal to 1;

a fourth matrix computing circuit for outputting two values by multiplying a set of the preprocessed third and seventh function values by a fourth 2×2 matrix with no elements equal to 1;

a first intermediate value generating circuit for outputting a first set of four intermediate values by performing addition and subtraction between the two values output from the first matrix computing circuit and the two values output from the second matrix computing circuit;

a second intermediate value generating circuit for outputting a second set of four values by first obtaining four values through addition and subtraction between the two values output from the third matrix computing circuit and the two values output from the fourth matrix computing circuit, and then multiplying the thus obtained four values by respective constants; and a postprocessing circuit for computing four function values in the domain of position variables by respectively adding the four intermediate values of the first set to the four intermediate values of the second set, and for computing the remaining four function values in the domain of position variables by respectively subtracting the four intermediate values of the second set from the four intermediate values of the first set.

2. An 8-point inverse discrete cosine transform apparatus according to claim 1, wherein the first, second, third, and fourth matrix computing circuits each include a single multiplier circuit to which the two values specified in the aforementioned manner are alternately input twice, and an adder-subtractor for producing the aforementioned two output values by performing addition and subtraction alternately on two pairs of successive multiplication results.

3. An 8-point inverse discrete cosine transform apparatus according to claim 2, further comprising a data distribution circuit for distributing the zeroth function value, the second function value, the fourth function value, the sixth function value, the first function value, the preprocessed third function value, the preprocessed fifth function value, and the preprocessed seventh function value among the first, second, third, and fourth matrix computing circuits appropriately in the specified manner.

4. An 8-point inverse discrete cosine transform apparatus according to claim 3, wherein the eight function values in the frequency domain are input to the preprocessing circuit two values at a time at the same rate as the rate of input to the matrix computing circuits, a combination of the fifth and seventh function values being input following a combination of the first and third function values, further comprising a data selection circuit for supplying the function value combinations to the preprocessing circuit appropriately in the specified manner.

5. An 8-point inverse discrete cosine transform apparatus according to claim 3, wherein the eight function values in the frequency domain are input to the preprocessing circuit at a rate twice the rate of input to the matrix computing circuits and in the order of the first, third, fifth, and seventh function values, further comprising a data selection circuit for supplying the function values to the preprocessing circuit in the specified order.

6. An 8-point inverse discrete cosine transform apparatus according to claim 2, further comprising a data distribution circuit for distributing the zeroth, second, fourth, and sixth function values between the first and second matrix computing circuits appropriately in the specified manner, and for distributing the first, third, fifth, and seventh function values to the preprocessing circuit appropriately so that outputs from the preprocessing circuit are supplied to the third and fourth matrix computing circuits in the specified manner.

7. An 8-point inverse discrete cosine transform apparatus according to claim 6, wherein the function values in the frequency domain are input to the preprocessing circuit two values at a time at the same rate as the rate of input to the matrix computing circuits, a combination of the fifth and seventh function values being input following a combination of the first and third function values, further comprising a data selection circuit for supplying the function values to the data distribution circuit so that the function value combinations can be supplied to the preprocessing circuit appropriately in the specified manner.

8. An 8-point inverse discrete cosine transform apparatus according to claim 2, wherein the multiplier circuit contained in the first matrix computing circuit is a semifixed multiplier which multiplies an input value by a constant.

9. An 8-point inverse discrete cosine transform apparatus according to claim 2, wherein the multiplier circuit contained in the third matrix computing circuit comprises a bit shift circuit for multiplying an input value by ½ through bit shifting, a semifixed multiplier for multiplying an input value by a constant, and a selector for selecting either the bit shift circuit or the semifixed multiplier.

10. An 8-point inverse discrete cosine transform apparatus according to claim 2, wherein the two multiplier circuits respectively contained in the second and fourth matrix computing circuits, together comprise two semifixed multipliers, each for multiplying an input value by a constant, and selectors for selecting one or the other of the semifixed multipliers so that the semifixed multipliers are used alternately between the second and fourth matrix computing circuits.

11. An 8×8 inverse discrete cosine transform apparatus for converting 8×8 function values in a two-dimensional frequency domain to 8×8 function values in a two-dimensional domain of position variables by applying a one-dimensional inverse discrete cosine transform twice along different directions, comprising:

a first one-dimensional inverse discrete cosine transform circuit for applying a one-dimensional inverse discrete cosine transform to the 8×8 function values in the two-dimensional frequency domain along one direction of the variables;

a memory circuit for temporarily storing an output of the first one-dimensional inverse discrete cosine transform circuit; and a second one-dimensional inverse discrete cosine transform circuit for applying a one-dimensional inverse discrete cosine transform to the 8×8 function values stored in the memory circuit along the other direction of the variables;

wherein the first and second one-dimensional inverse discrete cosine transform circuits successively transform eight function values for each value of a variable not subjected to the transform, and when the eight function values are designated as the zeroth to the seventh function value in ascending order of the variables subjected to the transform, the first and second one-dimensional inverse discrete cosine transform circuits each comprise:

a preprocessing circuit for preprocessing the seventh function value by adding the fifth function value, preprocessing the fifth function value by adding the third function value, and preprocessing the third function value by adding the first function value;

a first matrix computing circuit for outputting two values by multiplying a set of the zeroth and fourth function values by a first 2×2 matrix with no elements equal to 1;

a second matrix computing circuit for outputting two values by multiplying a set of the second and sixth function values by a second 2×2 matrix with no elements equal to 1;

a third matrix computing circuit for outputting two values by multiplying a set of the first function value and the preprocessed fifth function value by a third 2×2 matrix with no elements equal to 1;

a fourth matrix computing circuit for outputting two values by multiplying a set of the preprocessed third and seventh function values by a fourth 2×2 matrix with no elements equal to 1;

a first intermediate value generating circuit for outputting a first set of four intermediate values by performing addition and subtraction between the two values output from the first matrix computing circuit and the two values output from the second matrix computing circuit;

a second intermediate value generating circuit for outputting a second set of four values by first obtaining four values through addition and subtraction between the two values output from the third matrix computing circuit and the two values output from the fourth matrix computing circuit, and then multiplying the thus obtained four values by respective constants; and a postprocessing circuit for computing four function values in the domain of position variables by respectively adding the four intermediate values of the first set to the four intermediate values of the second set, and for computing the remaining four function values in the domain of position variables by respectively subtracting the four intermediate values of the second set from the four intermediate values of the first set.

12. An 8×8 inverse discrete cosine transform apparatus according to claim 11, wherein the first, second, third, and fourth matrix computing circuits each include a single multiplier circuit to which the two values specified in the aforementioned manner are alternately input twice, and an adder-subtractor for producing the aforementioned two output values by alternately performing addition and subtraction on two pairs of successive multiplication results.

13. An 8×8 inverse discrete cosine transform apparatus for converting 8×8 function values in a two-dimensional frequency variability domain to 8×8 function values in a two-dimensional variability domain of position variables by applying a one-dimensional inverse discrete cosine transform twice along different directions, comprising:

a one-dimensional inverse discrete cosine transform circuit for applying a one-dimensional discrete cosine transform to the input 8×8 function values in the two-dimensional domain along one predetermined direction of the variables;

a transposition memory circuit for temporarily storing the 8×8 function values output from the one-dimensional inverse discrete cosine transform circuit, and outputting the transpose thereof, thereby changing the direction of the variables along which the one-dimensional inverse discrete cosine transform is to be applied;

a selector for selecting either the 8×8 function values in the two-dimensional frequency domain or the output of the transposition memory circuit for input to the one-dimensional inverse discrete cosine transform circuit; and a control circuit for controlling the selector to select the 8×8 function values in the two-dimensional frequency domain for the first one-dimensional inverse discrete cosine transform, and to select the output of the transposition memory circuit for the second one-dimensional inverse discrete cosine transform, wherein the one-dimensional inverse discrete cosine transform circuit successively converts eight function values for each value of a variable not subjected to the transform, and when the eight function values are designated as the zeroth to the seventh function value in ascending order of the variables subjected to the transform, the one-dimensional inverse discrete cosine transform circuit comprises:

a preprocessing circuit for preprocessing the seventh function value by adding the fifth function value, preprocessing the fifth function value by adding the third function value, and preprocessing the third function value by adding the first function value;

a first matrix computing circuit for outputting two values by multiplying a set of the zeroth and fourth function values by a first 2×2 matrix with no elements equal to 1;

a second matrix computing circuit for outputting two values by multiplying a set of the second and sixth function values by a second 2×2 matrix with no elements equal to 1;

a third matrix computing circuit for outputting two values by multiplying a set of the first function value and the preprocessed fifth function value by a third 2×2 matrix with no elements equal to 1;

a fourth matrix computing circuit for outputting two values by multiplying a set of the preprocessed third and seventh function values by a fourth 2×2 matrix with no elements equal to 1;

a first intermediate value generating circuit for outputting a first set of four intermediate values by performing addition and subtraction between the two values output from the first matrix computing circuit and the two values output from the second matrix computing circuit;

a second intermediate value generating circuit for outputting a second set of four values by first obtaining four values through addition and subtraction between the two values output from the third matrix computing circuit and the two values output from the fourth matrix computing circuit, and then multiplying the thus obtained four values by respective constants; and a postprocessing circuit for computing four function values in the domain of position variables by respectively adding the four intermediate values of the first set to the four intermediate values of the second set, and for computing the remaining four function values in the domain of position variables by respectively subtracting the four intermediate values of the second set from the four intermediate values of the first set.

14. An 8×8 inverse discrete cosine transform apparatus according to claim 13, wherein the first, second, third, and fourth matrix computing circuits each include a single multiplier circuit to which the two values specified in the aforementioned manner are alternately input twice, and an adder-subtractor for producing the aforementioned two output values by alternately performing addition and subtraction on two pairs of successive multiplication results.

15. An 8×8 inverse discrete cosine transform apparatus according to claim 14, wherein the one-dimensional inverse discrete cosine transform circuit outputs the one-dimensional inverse discrete cosine transform multiplied bye, the 8×8 inverse discrete cosine transform apparatus further comprises a divider for shifting bits in input data and thereby multiplying the input data by ½ for output, and a second selector for connecting the output of the one-dimensional inverse discrete cosine transform circuit either to an input of the transposition memory circuit or to an input of the divider, and the control circuit controls the second selector to select the input of the transposition memory circuit for the first one-dimensional inverse discrete cosine transform, and to select the input of the divider for the second one-dimensional inverse discrete cosine transform.

16. An 8×8 inverse discrete cosine transform apparatus according to claim 15, wherein the multiplier circuit contained in the first matrix computing circuit is a bit shift circuit for multiplying the input value by ½ through bit shifting, the multiplier circuit contained in the third matrix computing circuit comprises a bit shift circuit for multiplying an input value by ½ through bit shifting, a semifixed multiplier for multiplying an input value by a constant, and a selector for selecting either the bit shift circuit or the semifixed multiplier, and the two multiplier circuits, respectively contained in the second and fourth matrix computing circuits, together comprise two semifixed multipliers, each for multiplying an input value by a constant, and selectors for selecting one or the other of the semifixed multipliers so that the semifixed multipliers are used alternately between the second and fourth matrix computing circuits.

* * * * *